United States Patent
Geisberger

(10) Patent No.: US 10,760,909 B2
(45) Date of Patent: Sep. 1, 2020

(54) ANGULAR RATE SENSOR WITH IN-PHASE DRIVE AND SENSE MOTION SUPPRESSION

(71) Applicant: NXP USA, Inc., Austin, TX (US)

(72) Inventor: Aaron A. Geisberger, Austin, TX (US)

(73) Assignee: NXP USA, Inc., Austin, TX (US)

( * ) Notice: Subject to any disclaimer, the term of this patent is extended or adjusted under 35 U.S.C. 154(b) by 235 days.

(21) Appl. No.: 16/010,783

(22) Filed: Jun. 18, 2018

(65) Prior Publication Data
US 2019/0383612 A1   Dec. 19, 2019

(51) Int. Cl.
G01C 19/5712   (2012.01)

(52) U.S. Cl.
CPC .............................. *G01C 19/5712* (2013.01)

(58) Field of Classification Search
CPC ............ G01C 19/5712; G01C 19/5719; G01C 19/574; G01C 19/5747; G01C 19/5755; G01C 19/5762; G01C 19/5733
USPC ............................ 73/504.12, 504.02, 504.04
See application file for complete search history.

(56) References Cited

U.S. PATENT DOCUMENTS

| | | | |
|---|---|---|---|
| 5,635,640 A | 6/1997 | Geen | |
| 6,122,961 A | 9/2000 | Geen | |
| 6,877,374 B2 | 4/2005 | Geen | |
| 6,915,693 B2 | 7/2005 | Kim et al. | |
| 7,036,373 B2 | 5/2006 | Johnson et al. | |
| 7,191,653 B2 | 3/2007 | Park et al. | |
| 7,421,897 B2 | 9/2008 | Geen et al. | |
| 8,689,632 B2 | 4/2014 | Jia et al. | |
| 8,844,357 B2 | 9/2014 | Scheben et al. | |
| 9,157,740 B2 | 10/2015 | Kempe | |
| 9,857,175 B2 | 1/2018 | Kempe | |
| 2010/0116050 A1 | 5/2010 | Wolfram | |
| 2010/0313657 A1 | 12/2010 | Trusov et al. | |
| 2016/0231115 A1 | 8/2016 | Piirainen | |
| 2017/0322028 A1 | 11/2017 | Coronato et al. | |
| 2017/0350701 A1 | 12/2017 | Geisberger | |
| 2018/0216935 A1* | 8/2018 | Senkal | G01C 19/5712 |

OTHER PUBLICATIONS

Trusov, A. A. et al; "Flat Is Not Dead: Current and Future Performance of Si-MEMS Quad Mass Gyro (QMG) system"; IEEE/ION Position, Location and Navigation Symposiums—Plans 2014 Monterey, CA, US; pp. 252-258 (2014).
U.S. Appl. No. 15/286,348, not yet published; 26 pages (Oct. 5, 2016).

* cited by examiner

*Primary Examiner* — Robert R Raevis
(74) *Attorney, Agent, or Firm* — Charlene R. Jacobsen

(57) ABSTRACT

A MEMS device includes first, second, third, and fourth sense masses spaced apart from a surface of a substrate. A first drive coupler interconnects the first sense mass with a first actuator, a second drive coupler interconnects the second sense mass with a second actuator, a third drive coupler interconnects the third sense mass with a third actuator, and a fourth drive coupler interconnects the fourth sense mass with a fourth actuator. Each of the drive couplers includes a torsion bar having a length aligned parallel to an outer sidewall of an adjacent sense mass and first and second coupling links coupled to opposing first and second ends of the torsion bar. The first and second coupling links couple an adjacent one of the first, second, third, and fourth sense masses with a corresponding one of the first, second, third, and fourth actuators.

20 Claims, 14 Drawing Sheets

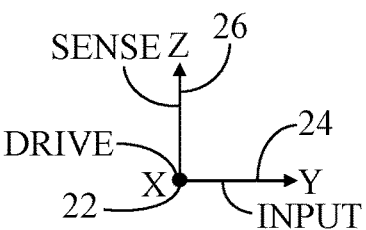
*FIG. 15*
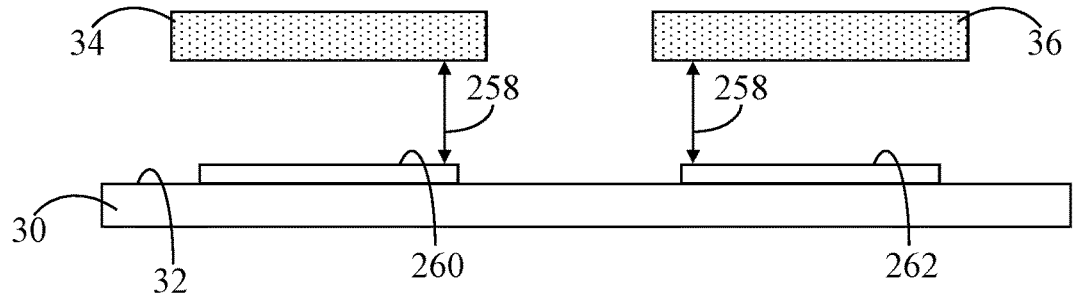
*FIG. 16*
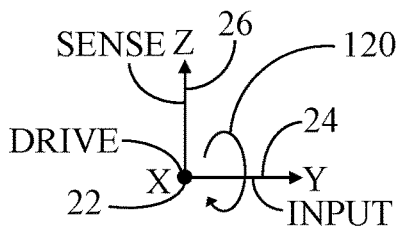
*FIG. 17*
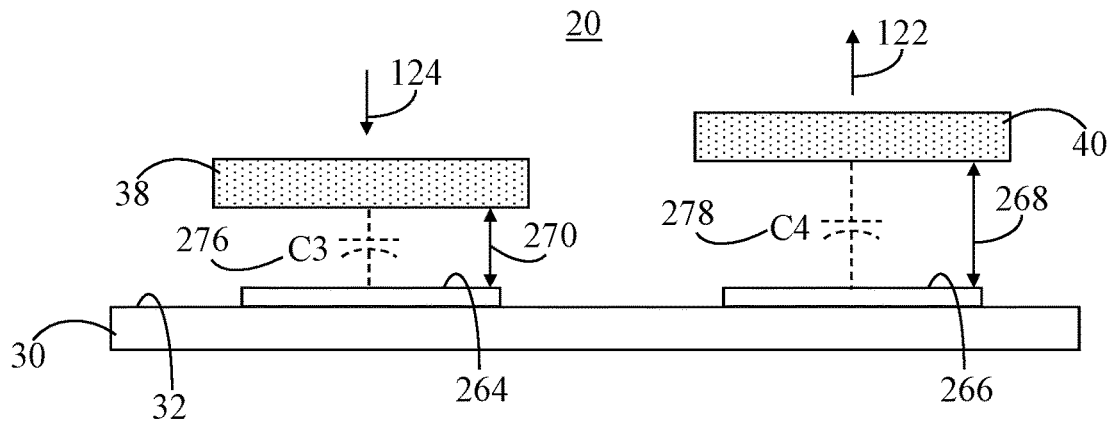

ically a MEMS angular rate sensor
device having multiple sense masses configured to sense
rotation about an in-plane axis.

ANGULAR RATE SENSOR WITH IN-PHASE DRIVE AND SENSE MOTION SUPPRESSION

TECHNICAL FIELD OF THE INVENTION

The present invention relates generally to microelectromechanical systems (MEMS) devices. More specifically, the present invention relates to a MEMS angular rate sensor device having multiple sense masses configured to sense rotation about an in-plane axis.

BACKGROUND OF THE INVENTION

An angular rate sensor, also referred to as a gyroscope, senses angular speed, rate, or velocity, also referred to as angular rate of rotation, around one or more axes. Commonly, angular rate sensors are microelectromechanical systems (MEMS) devices manufactured using MEMS technology, which provides a way to make very small mechanical structures and integrate these structures with electrical devices on a single substrate using conventional batch semiconductor processing techniques. MEMS angular rate sensors are widely used in applications such as automotive, inertial guidance systems, gaming systems, smartphones, cameras, etc.

Some prior art MEMS angular rate sensors utilize multiple vibrating structures or masses that are suspended over a substrate. Such MEMS angular rate sensors are often referred to in the art as vibrating structure gyroscopes or Coriolis vibratory gyroscopes. One type of vibrating structure angular rate sensor is a "tuning fork" angular rate sensor having multiple masses, also referred to herein as Coriolis masses. In operation, at least some of the Coriolis masses, acting as drive masses, are driven to resonance in opposite directions, also referred to herein as anti-phase. In response to an external angular stimulus about an input axis, at least some of the Coriolis masses, acting as sense masses, move in phase opposition by exploiting a Coriolis acceleration component, also referred to in the art as the Coriolis effect. Namely, antiphase movement of the sense masses in response to the Coriolis effect has an amplitude that is proportional to the angular rate of rotation of the angular rate sensor about the input axis.

A drawback of angular rate sensors is their susceptibility to common mode excitation of the Coriolis masses in response to linear and/or angular acceleration due to an external stimulus such as shock, vibration, spurious or parasitic acceleration, etc. Common mode excitation, also referred to herein as in-phase motion, is a condition in which the Coriolis masses, operating as drive masses, sense masses, or both, move in the same direction and at the same amplitude and at a frequency (i.e., the common mode frequency) that is as low as or lower than an operating frequency of the angular rate sensor (i.e., the differential mode frequency). Common mode excitation can lead to inaccuracy or complete failure of the angular rate sensor.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

FIG. 15 shows a cross-sectional side view of the sense masses along section lines A-A of FIG. 14; and FIG. 16 shows a cross-sectional side view of the sense masses along section lines A-A of FIG. 14 undergoing antiphase sense motion; and FIG. 17 shows a cross-sectional side view of the sense masses along section lines B-B of FIG. 14.

DETAILED DESCRIPTION

In overview, the present disclosure concerns microelectromechanical systems (MEMS) devices and methods of operation. More particularly, a MEMS angular rate sensor device includes a four-sense mass architecture configured to sense angular velocity about an in-plane axis relative to the substrate. Further, the four sense masses are configured to be driven in-plane relative to the substrate with the sense motion of the sense masses being in a perpendicular out-of-plane direction. Still further, structures are provided for tightly coupling each drive actuator with its corresponding sense mass for in-plane drive motion while isolating the in-plane drive motion from the out-of-plane sense motion. These structures can improve the sense efficiency of the MEMS angular rate sensor device, where the structures maintain a substantially parallel orientation of the sense masses to underlying electrodes. Additionally, structures are provided for mechanically constraining or suppressing in-phase (i.e., common mode) drive and sense motion of the sense masses for improved accuracy and robustness.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching may be utilized in the illustrations, the different elements within the structural layers may be formed out of the same material.

Figure 1:
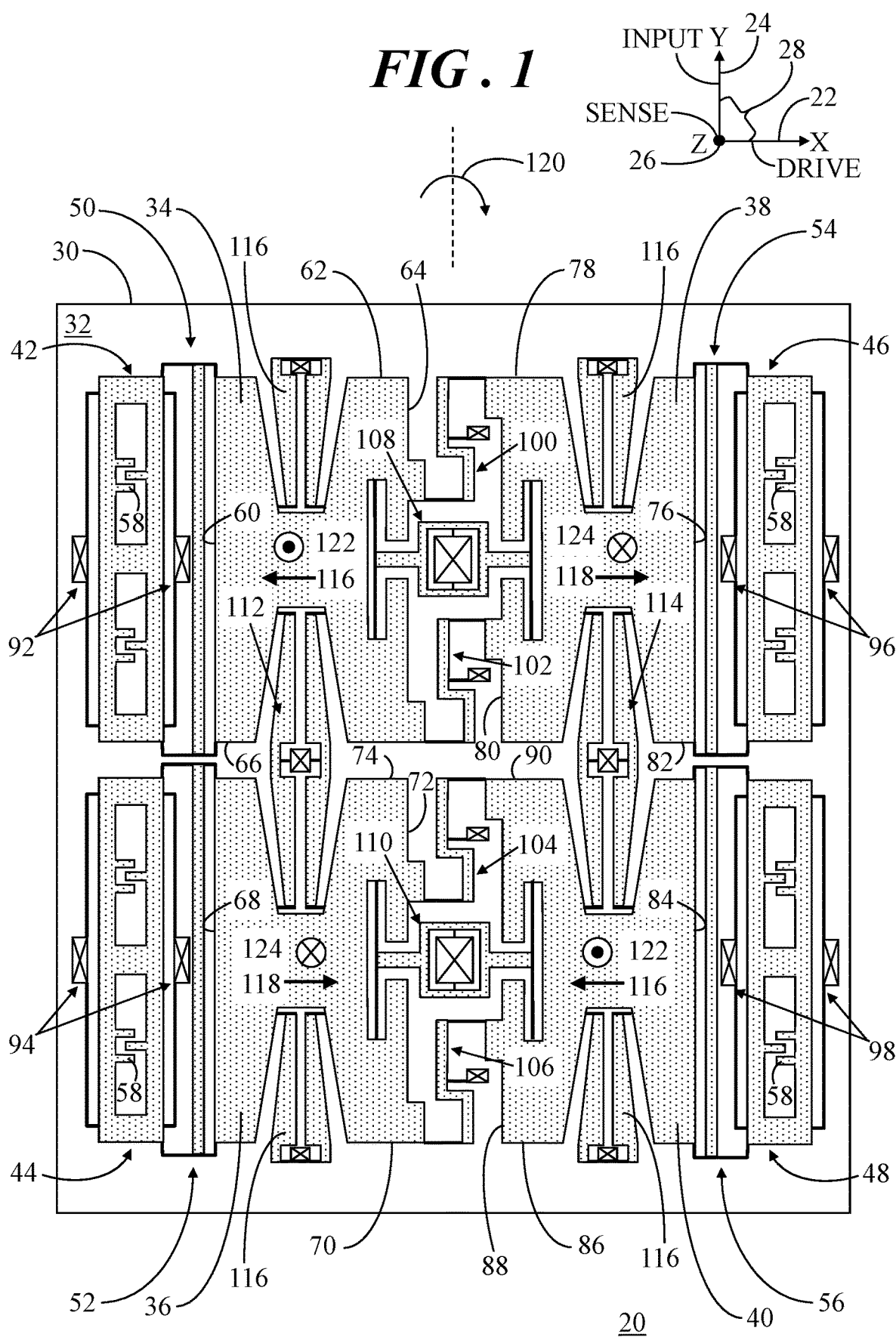
FIG. 1 shows a top view of a microelectromechanical systems (MEMS) device in accordance with some embodiments.

Referring to FIG. 1, FIG. 1 shows a top view of a microelectromechanical systems (MEMS) device 20 in accordance with some embodiments. In an example embodiment, MEMS device 20 is a MEMS angular rate sensor, alternatively referred to as a gyroscope, that is configured to sense angular velocity about an axis of rotation referred to herein as an input axis. Hence, MEMS device 20 may be alternatively referred to herein as angular rate sensor 20. In the top view illustration of FIG. 1, a three-dimensional coordinate system is represented in which an X-axis 22 is directed rightward and leftward on the page, a Y-axis 24 is directed upward and downward on the page, and a Z-axis 26 is directed into and out of the page. Together, X-axis 22 and Y-axis 24 define an X-Y plane 28. In this configuration, the axis of rotation (i.e., the input axis) of angular rate sensor 20 is Y-axis 24. Thus, Y-axis 24 is referred to herein as input axis 24. As will be discussed in greater detail below, X-axis 22 is the drive axis and Z-axis 26 is the sense axis. Thus, X-axis 22 is referred to herein as drive axis 22 and Z-axis 26 is referred to herein as sense axis 26.

Angular rate sensor 20 includes a substrate 30 having a planar surface 32 that is oriented substantially parallel with X-Y plane 28. First, second, third, and fourth sense masses 34, 36, 38, 40, respectively, are suspended in spaced apart relationship with planar surface 32 of substrate 30. Similarly, first, second, third, and fourth actuators 42, 44, 46, 48, respectively, are suspended in spaced apart relationship with planar surface 32 of substrate 30. A first drive coupler 50 interconnects first sense mass 34 with first actuator 42, a second drive coupler 52 interconnects second sense mass 36 with second actuator 44, a third drive coupler 54 interconnects third sense mass 38 with third actuator 46, and a fourth drive coupler 56 interconnects fourth sense mass 40 with fourth actuator 48. First, second, third, and fourth actuators 42, 44, 46, 48 are relatively independent from one another. That is, there are no direct interconnecting links between any of actuators 42, 44, 46, 48.

As used herein, first, second, third, and fourth sense masses 34, 36, 38, 40 are components that move in response to a drive mode force and to a sense mode force that acts upon masses 34, 36, 38, 40. Whereas, first, second, third, and fourth actuators 42, 44, 46, 48 are configured to generate the drive mode force that is imposed upon the corresponding one of first, second, third, and fourth sense masses 34, 36, 38, 40. However, structures described herein suppress motion of first, second, third, and fourth actuators 42, 44, 46, 48 in response to the sense mode force.

In the depicted embodiment, and as described more fully below, first, second, third, and fourth sense masses 34, 36, 38, 40 are configured to undergo in-plane oscillatory linear motion in a drive direction that is substantially parallel to the X-axis (i.e., drive axis 22) and in a sense direction that is substantially parallel to the Z-axis (i.e., sense axis 26). First, second, third, and fourth actuators 42, 44, 46, 48 are configured to undergo in-plane oscillatory linear motion in the drive direction only.

Those skilled in the art will recognize that first, second, third, and fourth actuators 42, 44, 46, 48 will have drive comb structures, a few of these are shown, within central openings for enabling linear motion in the drive direction. Electrodes (not visible) may underlie first, second, third, and fourth sense masses 34, 36, 38, 40 for detecting sense motion in the sense direction along sense axis 26 perpendicular to planar surface 32 of substrate 20.

First and second sense masses 34, 36 are laterally adjacent to one another, and third and fourth sense masses 38, 40 are laterally adjacent to one another. Additionally, first and third sense masses 34, 38 are laterally adjacent to on another, and second and fourth sense masses are laterally adjacent to one another. This relative orientation of first, second, third, and fourth sense masses 34, 36, 38, 40 is substantially in the shape of a quadrangle. As will be discussed in greater detail below, first and third sense masses 34, 38 may be considered a dual mass vibratory gyroscope device and second and fourth sense masses 36, 40 may be considered another dual mass vibratory gyroscope device. Together, first, second, third, and fourth sense masses 34, 36, 38, 40 may be considered a four sense mass vibratory gyroscope device.

First sense mass 34 has outer sidewalls 60, 62, and inner sidewalls 64, 66 that define a perimeter of first sense mass 34. Likewise, second sense mass 36 has outer sidewalls 68, 70, and inner sidewalls 72, 74 that define a perimeter of second sense mass 36. Third sense mass 38 has outer sidewalls 76, 78 and inner sidewalls 80, 82 that define a perimeter of third sense mass 38. And, fourth sense mass 40 has outer sidewalls 84, 86 and inner sidewalls 88, 90 that define a perimeter of fourth sense mass 40. As used herein, the term "outer sidewall" refers to any of the sidewalls of the sense masses that are arranged on the outside of the quadrangular arrangement of sense masses 34, 36, 38, 40. The term "inner sidewall" refers to any of the sidewalls of the sense masses that face a sidewall of another sense mass.

First, second, third, and fourth actuators 42, 44, 46, 48 are suspended apart from planar surface 32 of substrate 30 using various elastic components, rigid components, and anchors, as described herein. Further, first, second, third, and fourth drive couplers 50, 52, 54, 56 interconnect first, second, third, and fourth sense masses 34, 36, 38, 40 with their associated first, second, third, and fourth actuators 42, 44, 46, 48 using various mechanical linkages, including various elastic components, rigid components, and anchors, as described herein. And still further, first, second, third, and fourth sense masses 34, 36, 38, 40 are coupled together using various mechanical linkages, including various elastic components, stiff components, and anchors, as described herein.

As used herein, an elastic component generally refers to a resilient component that can spontaneously resume its original or normal shape after being stretched, compressed, or otherwise distorted. A stiff component generally refers to a component that is a rigid, or non-bending, relative to an elastic component. As such, stiff components are largely non-compliant, and the elastic components are more compliant than the stiff components. The elastic and stiff components are suspended above the planar surface of the substrate. The elastic components may include, by way of example, coupling links, spring structures, springs, flexures, flexible support elements, and the like. While certain elastic components are depicted as bars or folded springs, it should be understood that elastic components may have other shapes that can achieve the desired compliance, such as U-shaped elastic components, J-shaped elastic components, bent bars, and so forth. The stiff components may include, by way of example, torsion bars, bar structures, beam structures, pivot linkages, isolation structures, and the like. As further used herein, an anchor is a largely rigid element that is fixed directly to the surface of the substrate and suspends the elastic and stiff components above the planar surface of the substrate. The anchors are illustrated in the figures by boxes with a "X" therein.

Angular rate sensor 20 further includes first, second, third, and fourth suspension structures 92, 94, 96, 98, respectively, configured to suspend first, second, third, and fourth actuators 42, 44, 46, 48 in spaced apart relationship from planar surface 32 of substrate 30. A detailed discussion of the components of suspension structures 92, 94, 96, 98 will be provided in connection with FIGS. 2-3 herein. Again, first, second, third, and fourth drive couplers 50, 52, 54, 56, respectively, interconnect first, second, third, and fourth actuators 42, 44, 46, 48 with corresponding first, second, third, and fourth sense masses 34, 36, 38, 40. A detailed discussion of the components of drive couplers 50, 52, 54, 56 will be provided in connection with FIGS. 4-5 herein.

A number of coupling links are configured to connect first, second, third, and fourth sense masses 34, 36, 38, 40 and to enable suitable drive and sense motion while providing common mode suppression. The coupling links include first, second, third, and fourth drive mode linkages 100, 102, 104, 106 which will be described in detail in connection with FIGS. 6-8 herein; first and sense mode linkages 108, 110 which will be described in detail in connection with FIGS. 9-10; and first and second pivot structures 112, 114 which will be described in detail in connection with FIGS. 11-14. Angular rate sensor 20 may additionally include balancing links 116 coupled with outer sidewalls 62, 70, 78, and 86 of respective first, second, third, and fourth sense masses 34, 36, 38, 40.

In general, the coupling links (e.g., first, second, third, and fourth drive mode linkages 100, 102, 104, 106, first and sense mode linkages 108, 110, and first and second pivot structures 112, 114) allow antiphase drive and sense mass motions but exhibit higher stiffness to common mode motion of the sense masses. The oscillatory drive motion of first, second, third, and fourth sense masses 34, 36, 38, 40 is generally parallel to drive axis 22. Angular rate sensor 20 is sensitive to angular velocity about the axis of rotation, e.g., input axis 24. As such, the oscillatory sense motion of first, second, third, and fourth sense masses 34, 36, 38, 40 is generally parallel to sense axis 26 (e.g., the Z-axis perpendicular to planar surface 32 of substrate 30).

Angular rate sensor 20 is shown with arrows over each of first, second, third, and fourth sense masses 34, 36, 38, 40 indicating the direction of drive motion during one phase of the drive cycle. As shown, first and fourth sense masses 34, 40 are configured to be driven in a first drive direction (indicated by leftwardly directed arrows 116) parallel to drive axis 22 and second and third sense masses 36, 38 are configured to be driven in a second drive direction (indicated by rightwardly directed arrows 118) that is opposite first drive direction 116. Thus, second and third sense masses 36, 38 undergo oscillatory drive motion that is antiphase relative to the oscillatory drive motion of first and fourth sense masses 34, 40.

Additionally, angular rate sensor 20 is shown with symbols over each of first, second, third, and fourth sense masses 34, 36, 38, 40 that denote the direction of sense motion during one phase of the drive cycle. In response to angular velocity about input axis 24, represented by a curved arrow 120, first and fourth sense masses 34, 40 move in a first sense direction (indicated by an encircled dot 122 representing motion out of the page) parallel to sense axis 26 and second and third sense masses 36, 38 move in a second sense direction (indicated by an encircled "X" representing motion into the page) parallel to sense axis 26. Thus, second and third sense masses 36, 38 undergo oscillatory sense motion that is antiphase relative to the oscillatory sense motion of first and fourth sense masses 34, 40.

Together, the coupling links (e.g., first, second, third, and fourth drive mode linkages 100, 102, 104, 106, first and sense mode linkages 108, 110, and first and second pivot structures 112, 114) that are directly coupled to first, second, third, and fourth sense masses 34, 36, 38, 40 are configured to control the sense and drive frequency motion in the desired antiphase trajectories, as will be discussed in greater detail below.

Figure 2:
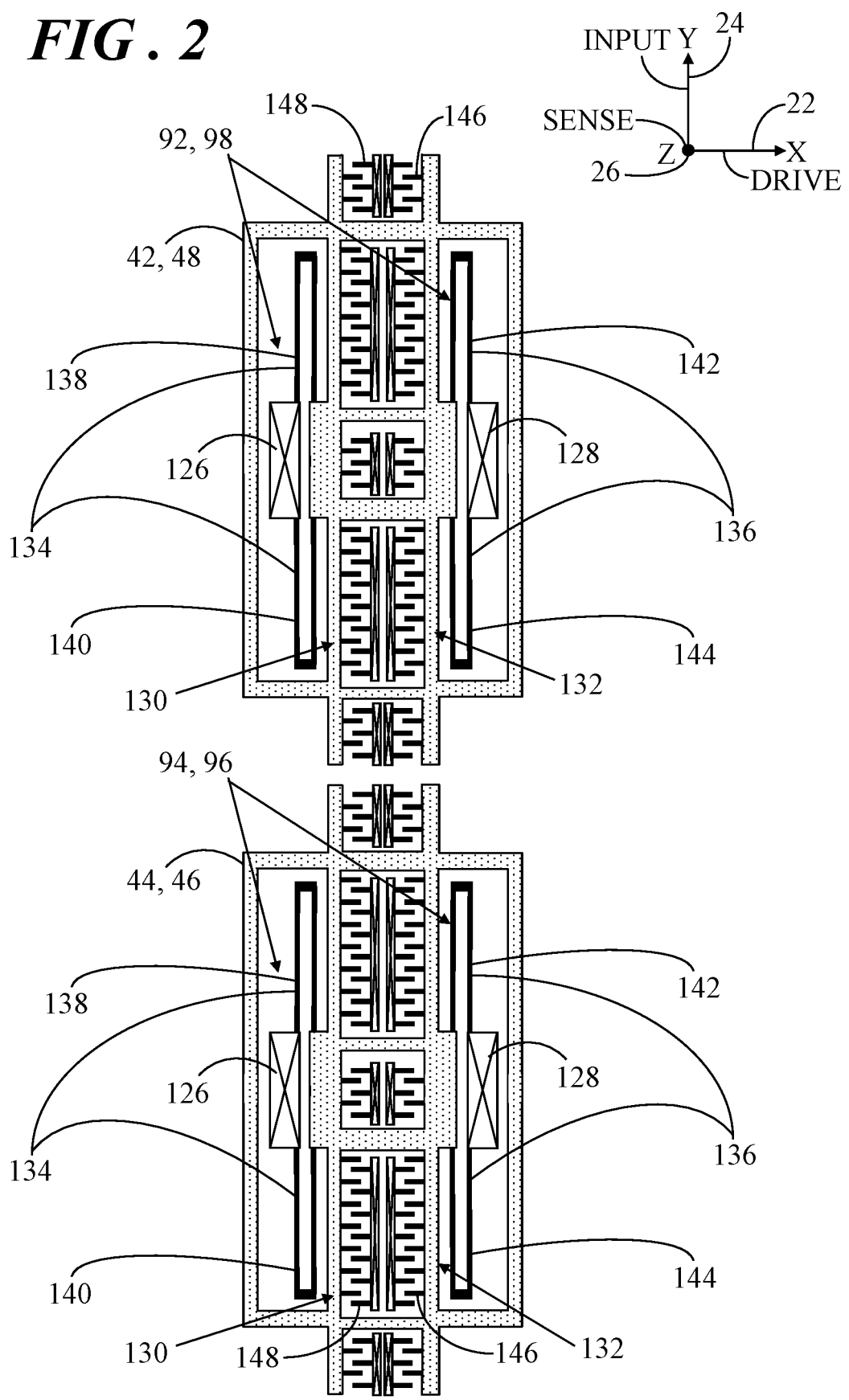
FIG. 2 shows a top view of suspension structures that may be implemented within the MEMS device of FIG. 1.

Referring now to FIG. 2 in connection with FIG. 1, FIG. 2 shows a top view of suspension structures that may be implemented within angular rate sensor 20 (FIG. 1). More particularly, one top view represents first and fourth suspension structures 92, 98 configured to suspend first and fourth actuators 42, 48 spaced apart from planar surface 32 of substrate 30 and another top view represents second and third suspension structures 94, 96 configured to suspend second and third actuators 44, 46.

Each of first, second, third, and fourth suspension structures 92, 94, 96, 98 includes first and second anchors 126, 128 coupled to planar surface 32 of substrate 30. First and second anchors 126, 128 are positioned proximate opposing first and second longitudinal edges 130, 132 of a corresponding one of first, second, third, and second actuators 42, 44, 46, 48. A first spring structure 134 is interconnected between first anchor 126 and first longitudinal edge 130 of the corresponding one of first, second, third, and fourth actuators 42, 44, 46, 48 and a second spring structure 136 is interconnected between second anchor 124 and second longitudinal edge 132 of the corresponding one of first and second actuators first, second, third, and second actuators 42, 44, 46, 48. In this example, first spring structure 134 includes a pair of folded springs 138, 140 interconnected between first anchor 126 and first longitudinal edge 130 that are compliant in the drive direction along drive axis 22. Likewise, second spring structure 136 includes a pair of folded springs 142, 144 interconnected between second anchor 128 and second longitudinal edge 130.

Movable comb fingers 146 of the drive comb structures are attached to first, second, third, and fourth actuators 42, 44, 46, 48 (e.g., the drive mass structures), and fixed comb fingers 148 are anchored to planar surface 32 of substrate 30. Comb fingers 148 are fixed, or non-movable, relative to movable comb fingers 146 due to their attachment to substrate 30. Comb fingers 146, 148 may be variously configured for actuation and feedback sensing of the actuation.

Figure 3:
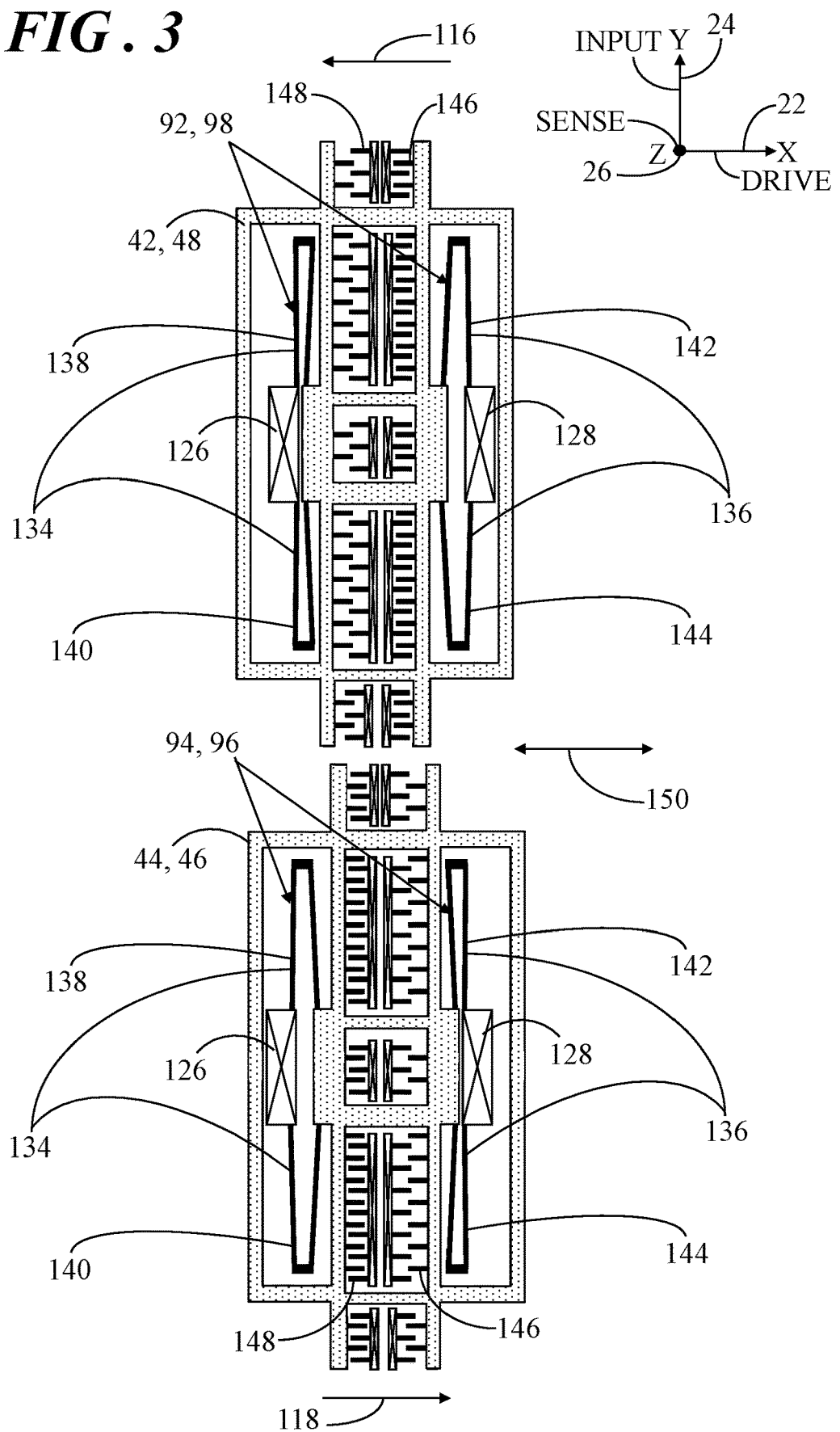
FIG. 3 shows a top view of the suspension structures demonstrating antiphase drive motion of the suspension structures.

FIG. 3 shows a top view of the suspension structures demonstrating antiphase drive motion of the suspension structures. Again, one top view represents first and fourth suspension structures 92, 98 configured to suspend first and fourth actuators 42, 48 spaced apart from planar surface 32 of substrate 30 and another top view represents second and third suspension structures 94, 96 configured to suspend second and third actuators 44, 46. Unidirectional arrows represent first and second drive directions 116, 118 of drive motion during one phase of the drive cycle and a bidirectional arrow 150 represents the direction of drive oscillation of first, second, third, and fourth actuators 42, 44, 46, 48. First and second spring structures 134, 136 enable in-plane translational movement of first, second, third, and fourth actuators 42, 44, 46, 48 relative to their associated first and second anchors 126, 128. Deformation of folded springs 138, 140, 142, 144 of first and second spring structures 134, 136 results from the in-plane translation of first, second, third, and fourth actuators 42, 44, 46, 48.

First, second, third, and fourth actuators 42, 44, 46, 48 suspended by suspension structures 92, 94, 96, 98 represent four drive actuation regions of angular rate sensor 20 (FIG. 1). The four drive actuation regions are relatively independent. This independence is achieved by a relatively low mass and suspension that enables primarily in-plane drive motion that is transferred to first, second, third, and fourth sense masses 34, 36, 38, 40 via first, second, third, and fourth drive couplers 50, 52, 56, 58. Additionally, by having first, second, third, and fourth actuators 42, 44, 46, 48 independent from one another and located on the outside of first, second, third, and fourth sense masses 34, 36, 38, 40 allows the alternating current (AC) drive signals to be routed away from the sensitive sense signals. Further, this independence simplifies the design via more modularity.

Figure 4:
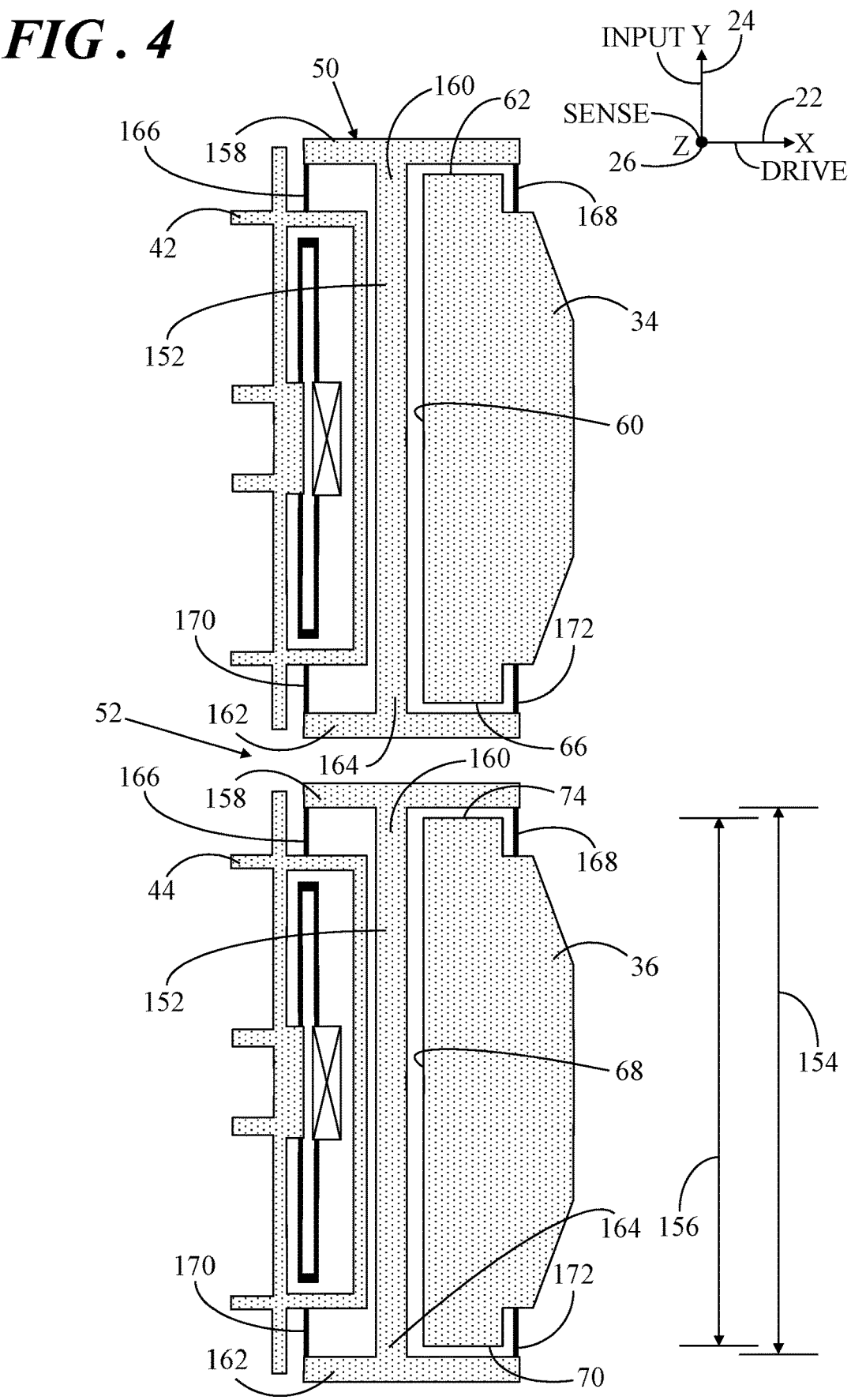
FIG. 4 shows a top view of drive couplers that may be incorporated within the MEMS device of FIG. 1.

Referring to FIGS. 1 and 4, FIG. 4 shows a top view of drive couplers that may be incorporated within angular rate sensor 20. More particularly, one top view represents first drive coupler 50 and its interconnection to each of first actuator 42 and first sense mass 34 and another top view represents second drive coupler 52 and its interconnection to each of second actuator 44 and second sense mass 36. Although only first and second drive couplers 50, 52 are described in detail herein, the following applies equivalently to third drive coupler 54 interconnected between third actuator 46 and third sense mass 38 and to fourth drive coupler 56 interconnected between fourth actuator 48 and fourth sense mass 40.

Each of first and second drive couplers 50, 52 (as well as, third, and fourth drive couplers 54, 56) includes a torsion bar 152 having a length 154 that is aligned parallel to an outer sidewall of an adjacent sense mass. Additionally, length 154 of torsion bar 152 is equivalent to or longer than an edge length 156 of the outer sidewall of the adjacent sense mass. In the illustrated example, torsion bar 152 of first drive coupler 50 is aligned adjacent and parallel to outer sidewall 60 of first sense mass 34 and torsion bar 152 of second drive coupler 52 is aligned adjacent and parallel to outer sidewall 68 of second sense mass 36.

A first coupling link 158 is coupled to a first end 160 of torsion bar 152 and couples the adjacent one of sense masses 34, 36, 38, 40 with a corresponding one of actuators 42, 44, 46, 48. A second coupling link 162 is coupled to a second end 164 of torsion bar 152 and couples the adjacent one of sense masses 34, 36, 38, 40 with the corresponding one of actuators 42, 44, 46, 48. In some embodiments, first coupling link 158 includes a first torsion beam 166 coupled to one of actuators 42, 44, 46, 48 and a second torsion beam 168 coupled to the adjacent one of sense masses 34, 36, 38, 40. Likewise, second coupling link 162 includes a third torsion beam 170 coupled to one of actuators 42, 44, 46, 48 and a fourth torsion beam 172 coupled to the adjacent one of sense masses 34, 36, 38, 40.

In the illustrated example, first and second coupling links 158, 162 of first drive coupler 50 interconnects first sense mass 34 with first actuator 42. More particularly, first and third torsion beams 166, 170 are coupled to first actuator 42 and second and fourth torsion beams 168 and 172 are coupled to first sense mass 34. The connection points of second and fourth torsion beams 168, 172 of first and second coupling links 158, 162 of first drive coupler 50 are on opposing outer and inner sidewalls 62, 66 of first sense mass 34 and the connection points are aligned with one another parallel to input axis 24. Likewise, first and second coupling links 158, 162 of second drive coupler 52 interconnects second sense mass 36 with second actuator 44. More particularly, first and third torsion beams 166, 170 are coupled to second actuator 44 and second and fourth torsion beams 168 and 172 are coupled to second sense mass 36. The connection points of second and fourth torsion beams 168, 172 of first and second coupling links 158, 162 of second drive coupler 52 are on opposing outer and inner sidewalls 70, 74 of second sense mass 36 and the connection points are aligned with one another parallel to input axis 24.

By equivalence, torsion bar 152 of third drive coupler 54 is aligned adjacent and parallel to outer sidewall 76 of third sense mass 38, first coupling link 158 of third drive coupler 54 couples third sense mass 38 with third actuator 46, and second coupling link 162 of third drive coupler 54 couples third sense mass 38 with third actuator 46. Further, torsion bar 152 of fourth drive coupler 56 is aligned adjacent and parallel to outer sidewall 84 of fourth sense mass 40, first coupling link 158 of fourth drive coupler 56 couples fourth sense mass 40 with fourth actuator 48, and second coupling link 162 of fourth drive coupler 56 couples fourth sense mass 40 with fourth actuator 48. As above, the connection points of respective torsion beams 168, 172 of first and second coupling links 158, 160 of third drive coupler 54 are on opposing outer and inner sidewalls 78, 82 of third sense mass 38 and are aligned with one another parallel to input axis 24 and the connection points of respective torsion beams 168, 172 of first and second coupling links 158, 162 of fourth drive coupler 56 are on opposing outer and inner sidewalls 86, 90 of fourth sense mass 40 and are aligned with one another parallel to input axis 24.

Figure 5:
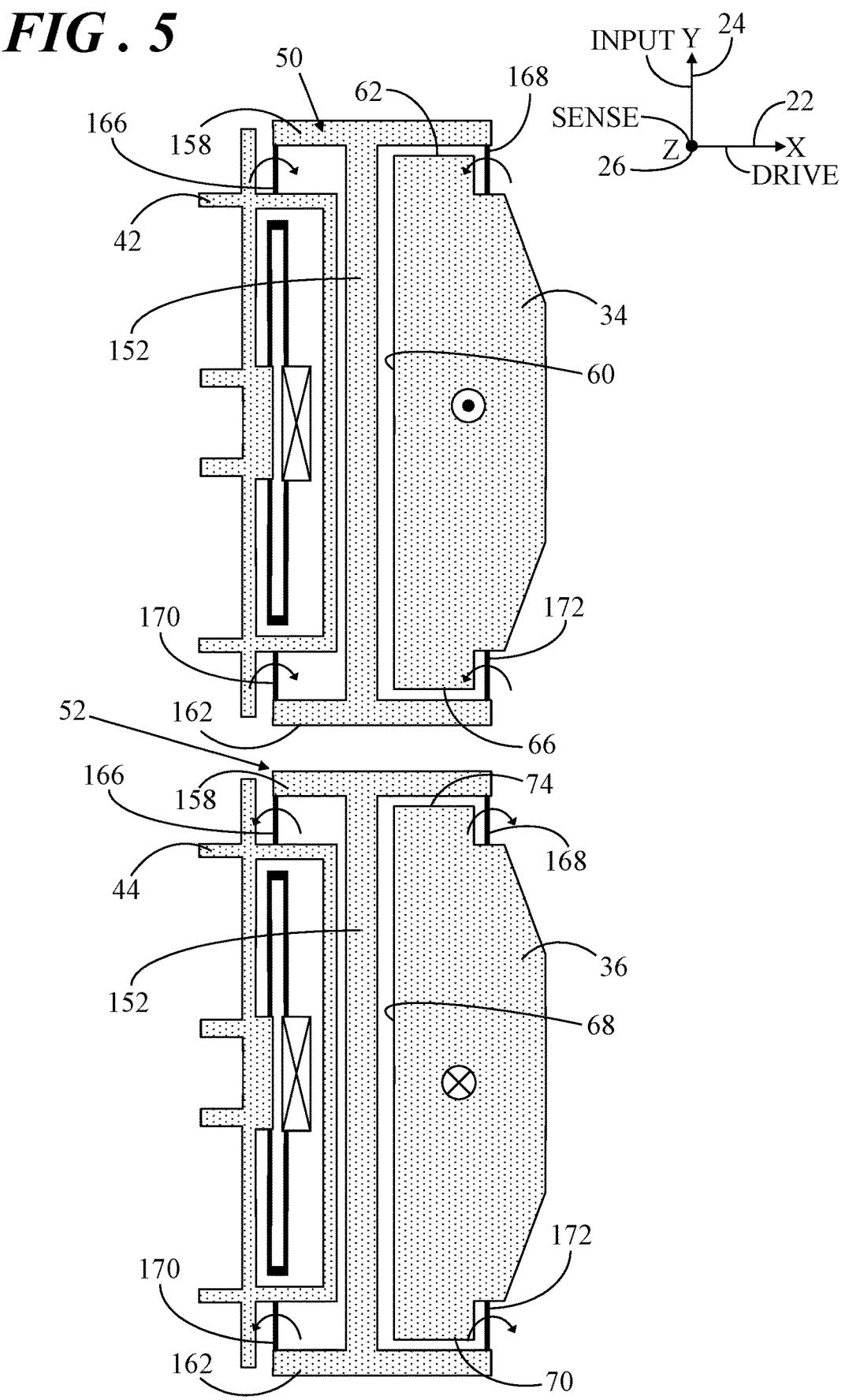
FIG. 5 shows a top view of the drive couplers demonstrating torsional motion that enables antiphase sense motion of sense masses of the MEMS device of FIG. 1.

FIG. 5 shows a top view of the drive couplers demonstrating torsional motion that enables antiphase sense motion of sense masses of angular rate sensor 20. Again, one top view represents first drive coupler 50 and its interconnection to each of first actuator 42 and first sense mass 34 and another top view represents second drive coupler 52 and its interconnection to each of second actuator 44 and second sense mass 36. However, the following applies equivalently to third drive coupler 54 interconnected between third actuator 46 and third sense mass 38 and to fourth drive coupler 56 interconnected between fourth actuator 48 and fourth sense mass 40.

First, second, third, and fourth drive couplers 50, 52, 54, 56 are configured to allow vertical sense motion (e.g., motion parallel to Z-axis 26) of their corresponding first, second, third, and fourth sense masses 34, 36, 38, 40 relative to first, second, third, and fourth actuators 42, 44, 46, 48 while limiting vertical (e.g., Z-axis motion) of first, second, third, and fourth actuators 42, 44, 46, 48. That is, torsion beams 166, 168, 170, 172 are vertically flexible so that corresponding pairs of torsion beams (e.g., first and second torsion beams 166, 168 and third and fourth torsion beams 170, 172) will flex (i.e., rotate or pivot) in opposing directions to enable the relative sense motion of first, second, third, and fourth sense masses 34, 36, 38, 40. Additionally, the presence of the rigid torsion bar 152 spanning the length of the adjacent sense mass suppresses possible twisting (e.g., pivoting or teeter-totter) motion of sense masses 34, 36, 38, 40 about X-axis 22.

Figure 6:
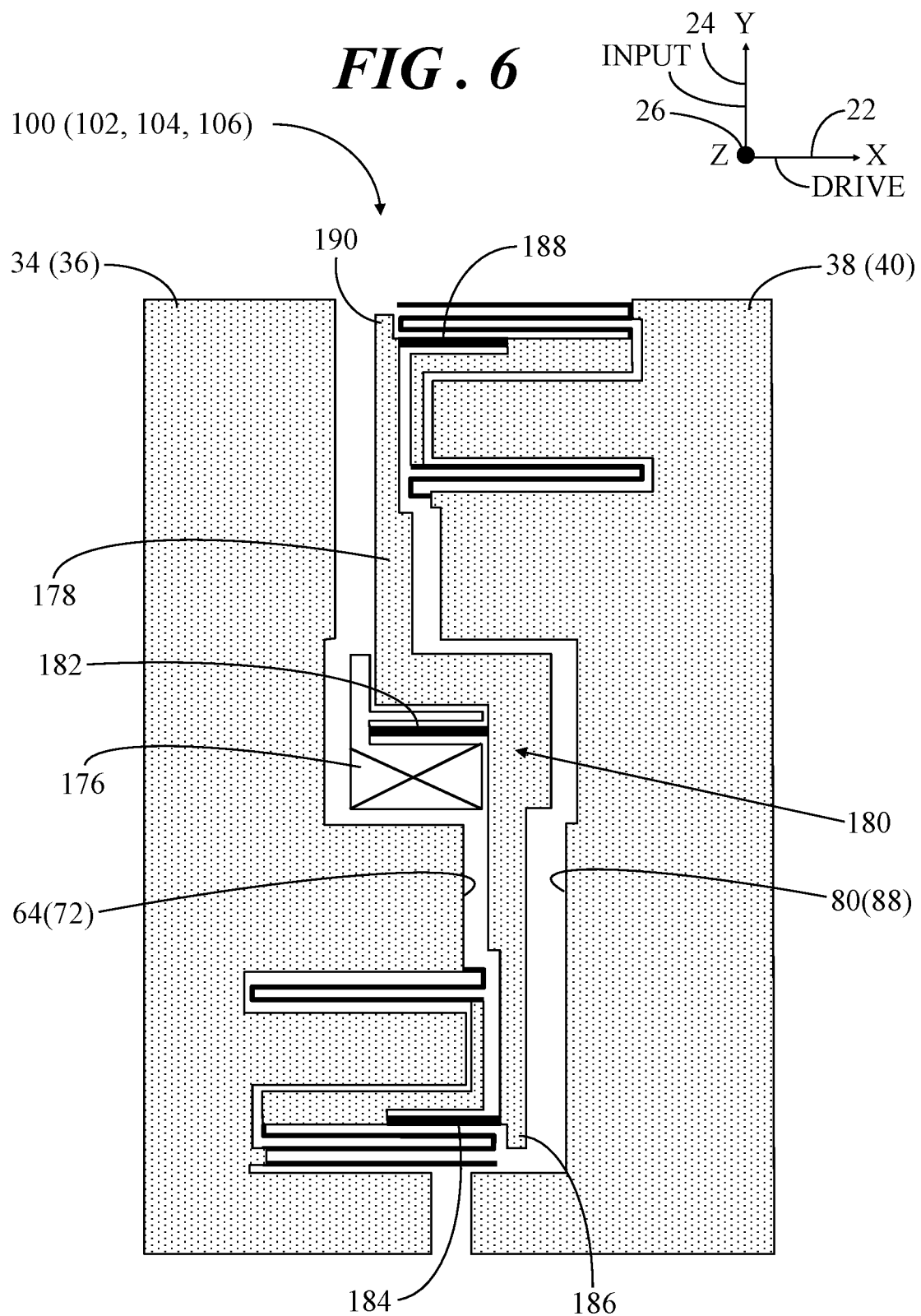
FIG. 6 shows a top view of a drive mode linkage that may be incorporated within the MEMS device of FIG. 1.

Referring now to FIGS. 1 and 6, FIG. 6 shows a top view of one of the drive mode linkages that may be incorporated within angular rate sensor 20. In particular, FIG. 6 shows first drive mode linkage 100 interconnecting first sense mass 34 to third sense mass 38. The following discussion applies equivalently to second drive mode linkage 102 also interconnecting first sense mass 34 to third sense mass 38. Additionally, the following discussion applies equivalently to third and fourth drive mode linkages 104, 106 interconnecting second sense mass 36 to fourth sense mass 40. Thus, FIG. 6 includes reference numerals 100 (102, 104, 106) denoting this equivalency. Similarly, FIG. 6 includes reference numerals 34 (36) and 38 (40) denoting the attachments of first, second, third, and fourth drive mode linkage 100, 102, 104, 106 to the respective first, second, third, and fourth sense masses 34, 36, 38, 40, described below.

First drive mode linkage 100 includes an anchor 176 coupled to planar surface 32 of substrate 30 and a bar structure 178 having a middle region 180 coupled to anchor 176 by a first spring beam 182. First drive mode linkage 100 further includes a second spring beam 184 coupled between an end 186 of bar structure 178 and inner sidewall 64 (facing third sense mass 38) of first sense mass 34 and a third spring beam 188 coupled between an opposite end 190 of bar structure 178 and inner sidewall 80 (facing first sense mass 34) of third sense mass 38. Second drive mode linkage 102 also includes anchor 176 coupled to planar surface 32 of substrate 30, bar structure 178 having middle region 180 coupled to anchor 176 by first spring beam 182, second spring beam 184 coupled between end 186 of bar structure 178 and inner sidewall 64 (facing third sense mass 38) of first sense mass 34, and third spring beam 188 coupled between opposite end 190 of bar structure 178 and inner sidewall 80 (facing first sense mass 34) of third sense mass 38.

Similarly, third drive mode linkage 104 includes anchor 176 coupled to planar surface 32 of substrate 30, bar structure 178 having middle region 180 coupled to anchor 176 by first spring beam 182, second spring beam 184 coupled between end 186 of bar structure 178 and inner sidewall 72 (facing fourth sense mass 40) of second sense mass 36, and third spring beam 188 coupled between opposite end 190 of bar structure 178 and inner sidewall 80 (facing second sense mass 36) of fourth sense mass 40. Fourth drive mode linkage 106 also includes anchor 176 coupled to planar surface 32 of substrate 30, bar structure 178 having middle region 180 coupled to anchor 176 by first spring beam 182, second spring beam 184 coupled between end 186 of bar structure 178 and inner sidewall 72 (facing fourth sense mass 40) of second sense mass 36, and third spring beam 188 coupled between opposite end 190 of bar structure 178 and inner sidewall 80 (facing second sense mass 36) of fourth sense mass 40.

In a neutral position (shown in FIG. 6), first, second, and third spring beams 182, 184, 188 are oriented substantially parallel to a direction of travel of first and third sense masses 34, 38. Thus, first, second, and third spring beams 182, 184, 188 are generally parallel to drive axis 22. However, bar structure 178 is oriented perpendicular to the direction of travel of first and third sense masses 34, 38, and therefore generally parallel to sidewalls 64, 72, 80, 88 of first, second, third, and fourth sense masses 34, 36, 38, 40. Thus, bar structure 178 is generally perpendicular to drive axis 22 and parallel to input axis 24. First, second, and third spring beams 182, 184, 188 are flexible relative to bar structure 178. As such, bar structure 178 is configured to pivot as first, second, and third spring beams 182, 184, 188 flex in response to movement of first and third sense masses 34, 38 relative to substrate 30 (FIG. 1).

In general, first and second drive mode linkages 100, 102 interconnecting first and third sense masses 34, 38 are configured to suppress common mode drive motion of first and third sense masses 34, 38. Likewise, third and fourth drive mode linkages 104, 106 interconnecting second and fourth sense masses 36, 40 are configured to suppress common mode drive motion of second and fourth sense masses 36, 40. That is, first, second, third, and fourth drive mode linkages 100, 102, 104, 106 exhibit high stiffness if first, second, third, and fourth sense masses 34, 36, 38, 40 were to move in-phase in the X-axis direction (e.g., parallel to drive axis 22). However, first, second, third, and fourth drive mode linkages 100, 102, 104, 106 allow antiphase drive motion of first, second, third, and fourth sense masses 34, 36, 38, 40. Hence, the nomenclature "drive mode" utilized herein in connection with first, second, third, and fourth drive mode linkages 100, 102, 104, 106. Additionally, bar structure 178 of first, second, third, and fourth drive mode linkages 100, 102, 104, 106 is configured to allow the antiphase vertical (e.g., Z-axis 26) sense motion of first and third sense masses 34, 38, while suppressing common mode sense motion. Thus, first, second, third, and fourth drive mode linkages 100, 102, 104, 106 may function secondarily to enable the antiphase vertical (e.g., parallel to sense axis 26) displacements between first and third sense masses 34, 38 and between second and fourth sense masses 36, 40 while exhibiting higher stiffness to in-phase vertical motion.

Figure 7:
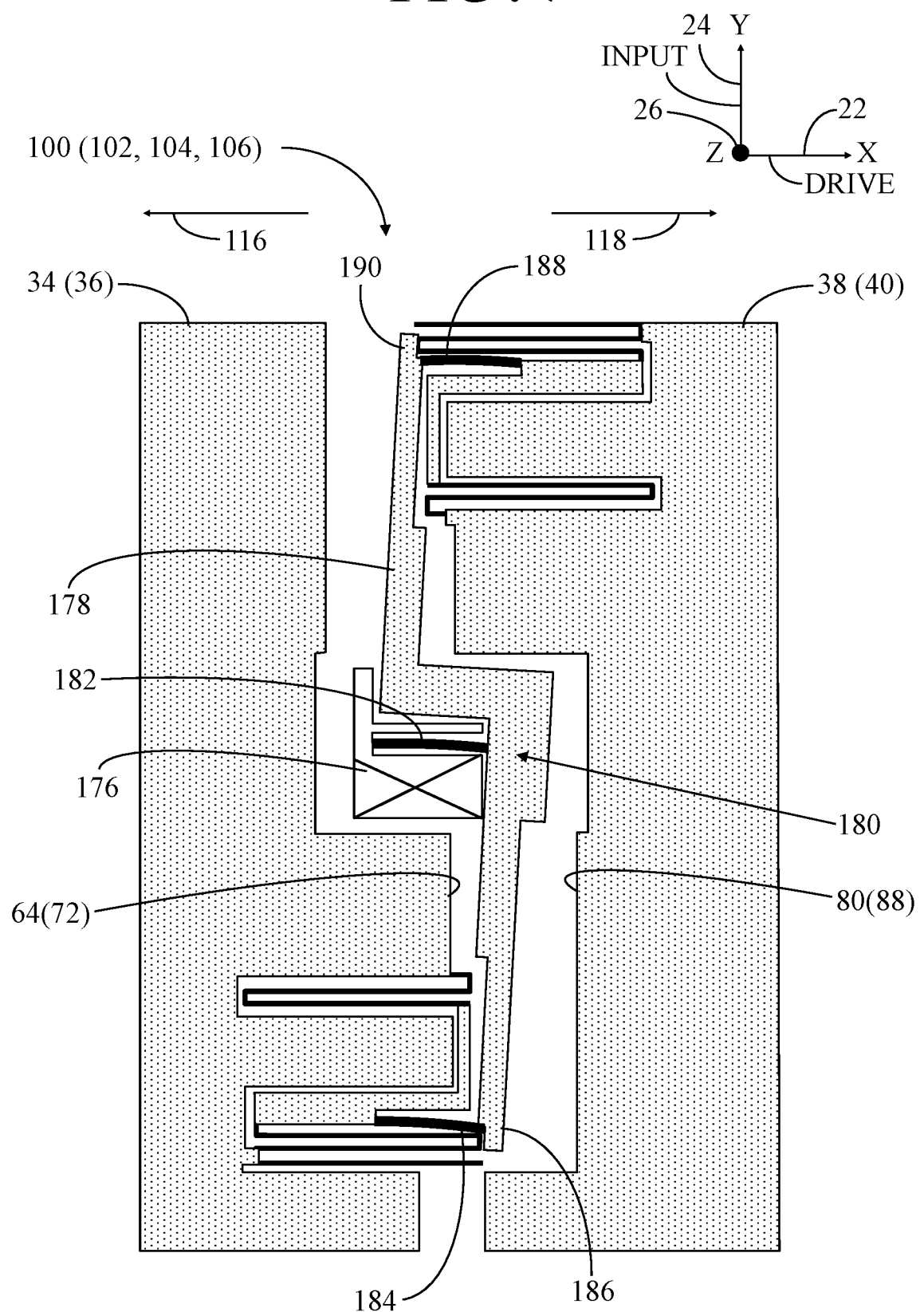
FIG. 7 shows a top view of the drive mode linkage pivoting in response to an external force exerted on a pair of the sense masses of the MEMS device of FIG. 1.

FIG. 7 shows a top view of first drive mode linkage 100 pivoting in response to force (e.g., drive force) exerted on first and third sense masses 34, 38 of angular rate sensor 20 (FIG. 1). In this example, when first and third sense masses 34, 38 are outwardly extended (i.e., have moved away from one another) as denoted by the outwardly directed arrows representing first and second drive directions 116, 118, bar structure 178 pivots generally clockwise about a pivot axis that is approximately centered at first spring beam 182, and first, second, and third spring beams 182, 184, 188 flex in response to the outward extension of first and third sense masses 34, 38.

Figure 8:
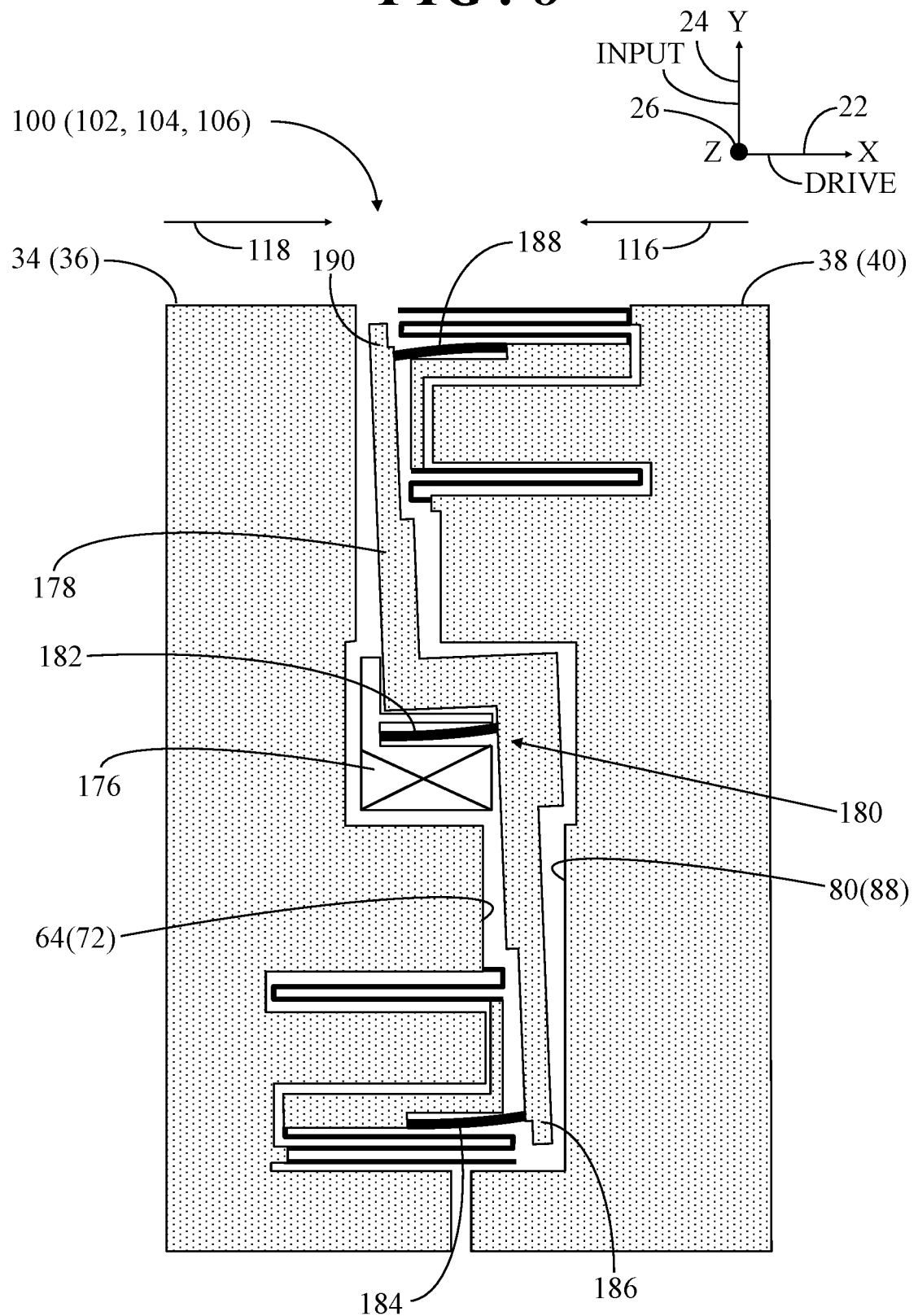
FIG. 8 shows a top view of the drive mode linkage pivoting in response to force exerted on a pair of the sense masses of the MEMS device of FIG. 1.

FIG. 8 shows a top view of the drive mode linkage 100 pivoting in response to force (e.g., drive force) exerted on first and third sense masses 34, 38 of angular rate sensor 20 (FIG. 1). In this example, when first and third sense masses 34, 38 are inwardly extended (i.e., have moved toward one another) as denoted by the inwardly directed arrows representing first and second drive directions 116, 118, bar structure 178 pivots generally counterclockwise about the pivot axis that is approximately centered at first spring beam 182, and first, second, and third spring beams 182, 184, 188 flex in response to the inward extension of first and third sense masses 34, 38.

Figure 9:
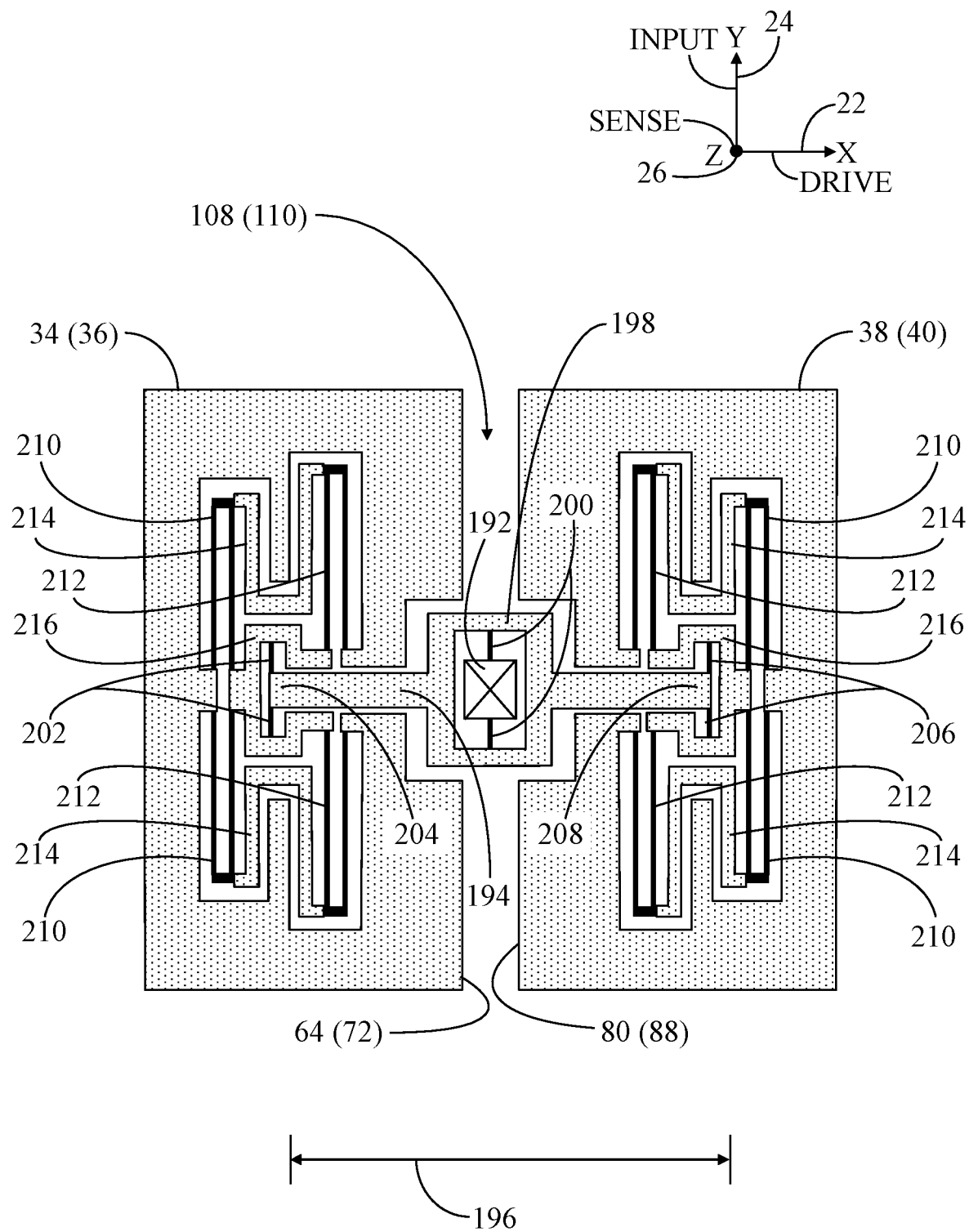
FIG. 9 shows a top view of a sense mode linkage that may be incorporated within the MEMS device of FIG. 1.

Referring now to FIGS. 1 and 9, FIG. 9 shows a top view of one of the sense mode linkages that may be incorporated within angular rate sensor 20. In particular, FIG. 9 shows first sense mode linkage 108 located between and interconnecting first sense mass 34 to third sense mass 38. Additionally, first sense mode linkage 108 is positioned between first and second drive mode linkages 100, 102 as particularly shown in FIG. 1. The following discussion applies equivalently to second sense mode linkage 110 located between and interconnecting second sense mass 36 to fourth sense mass 40. Additionally, second sense mode linkage 110 is positioned between third and fourth drive mode linkages 104, 106 as particularly shown in FIG. 1. Thus, FIG. 9 includes reference numerals 108 (110) denoting this equivalency. Similarly, FIG. 9 includes reference numerals 34 (36) and 38 (40) denoting the attachments of first and second sense mode linkages 108, 110 to the respective first, second, third, and fourth sense masses 34, 36, 38, 40, described below.

First sense mode linkage 108 includes an anchor 192 coupled to planar surface 32 of substrate 130, a beam structure 194 having a length 196 that is aligned with drive axis 22 and having a middle region 198 coupled to anchor 192 by a first flexure 200, a second flexure 202 coupled between an end 204 of beam structure 194 and inner sidewall 64 of first sense mass 34, and a third flexure 206 coupled between an opposing end 208 of beam structure 194 and inner sidewall 80 of third sense mass 38. Likewise, second sense mode linkage 110 includes anchor 192 coupled to planar surface 32 of substrate 130, beam structure 194 having length 196 that is aligned with drive axis 22 and having middle region 198 coupled to anchor 192 by first flexure 200, second flexure 202 coupled between end 204 of beam structure 194 and inner sidewall 72 of second sense mass 36, and third flexure 206 coupled between end 208 of beam structure 194 and inner sidewall 88 of fourth sense mass 40. First, second, and third flexures 200, 202, 206 may be torsion springs.

Each of first and second sense mode linkages 108, 110 may further include folded spring structures 210, 212, relatively rigid linking structures 214 connected between pairs of folded spring structures 210, 212, and relatively rigid isolation structures 216. Folded spring structures 210, 212 may be interconnected between an associated one of first, second, third, and fourth sense masses 34, 36, 38, 40, and one of isolation structures 216. One of isolation structures 216 is therefore connected to two pairs of folded spring structures 210, 212 (that are connected to first sense mass 34 and to second flexure 202 and another one of isolation structures 216 is therefore connected to two pairs of folded spring structures 210, 212 (that are connected to third sense mass 38 and to third flexure 206.

In general, first sense mode linkage 108 interconnecting first and third sense masses 34, 38 is configured to suppress common mode sense motion of first and third sense masses 34, 38. Likewise, second sense mode linkage 110 interconnecting second and fourth sense masses 36, 40 is configured to suppress common mode sense motion of second and fourth sense masses 36, 40. That is, first and second sense mode linkages 108, 110 exhibit low stiffness to antiphase vertical sense motion parallel to sense axis 26 while exhibiting high stiffness if first, second, third, and fourth sense masses 34, 36, 38, 40 were to move in-phase in the Z-axis direction (e.g., parallel to sense axis 26). Hence, the nomenclature "sense mode" utilized herein in connection with first and second sense mode linkages 108, 110. Folded spring structures 210, 212 allow in-plane antiphase drive motion (e.g., parallel to drive axis 22) of respective first, second, third, and fourth sense masses 34, 36, 38, 40 while linking structures 214 provide vertical (Z-axis 26) and Y-axis 24 stiffness between folded spring structures 210, 212. Further, isolation structures 216 isolate, or otherwise separate, first and second sense mode linkages 108, 110 from the in-plane motion of folded spring structures 210, 212.

Figure 10:
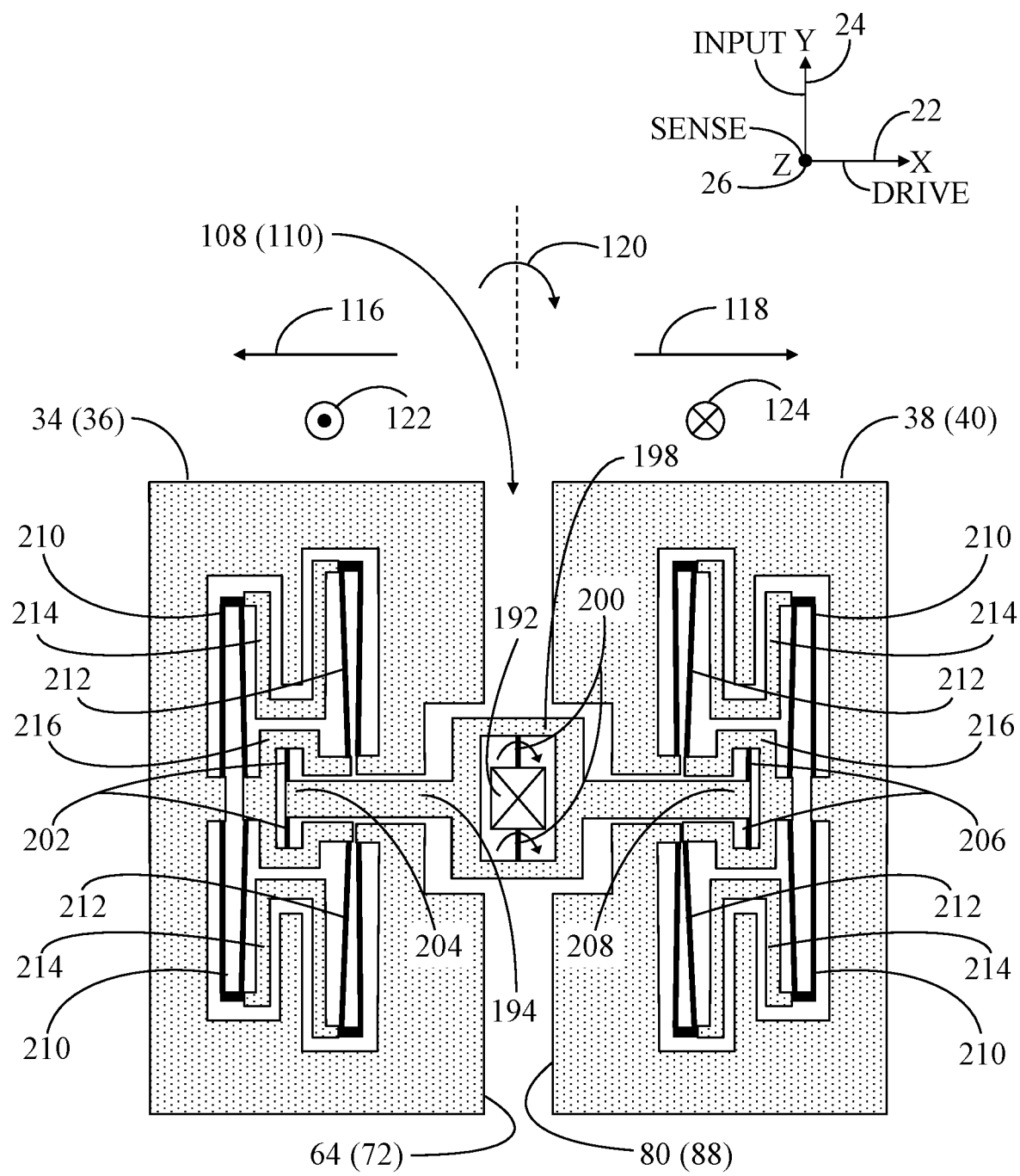
FIG. 10 shows a top view of the sense mode linkage in response to force exerted on a pair of the sense masses of the MEMS device of FIG. 1.

FIG. 10 shows a top view of first sense mode linkage 108 in response to external forces exerted on first and third sense masses 34, 38 of angular rate sensor 20 (FIG. 1). In this example, when first and third sense masses 34, 38 are outwardly extended (i.e., have moved away from one another) as denoted by the outwardly directed arrows representing first and second drive directions 116, 118, folded spring structures 210, 212 will suitably deform to allow in-plane antiphase drive motion (e.g., parallel to drive axis 22). Isolation structures 216 isolate first, second, and third flexures 200, 202, 206 of first sense linkage 108 from this antiphase drive motion so that first, second, and third flexures 200, 202, 206 are unlikely to deform in response to the in-plane antiphase drive motion. However, first, second, and third torsion flexures 200, 206, 208 can suitably deform to allow antiphase sense motion of first and third sense masses 34, 38, as represented by symbols denoting first and second sense directions 122, 124 that is parallel to sense axis 26 in response to angular velocity 120 about input axis 24.

With reference back to FIG. 1, first and third sense masses 34, 38 linked by first and third drive couplers 50, 54 to first and third actuators 42, 46 (with first and third sense masses 34, 38 being interconnected by first and second drive mode linkages 100, 102 and first sense mode linkage 108) may be considered a first dual mass vibratory gyroscope device. Second and fourth sense masses 36, 40 linked by second and fourth drive couplers 52, 56 to second and fourth actuators 44, 48 (with second and fourth sense masses 36, 40 being interconnected by third and fourth drive mode linkages 104, 106 and second sense mode linkage 110) may be considered a second dual mass vibratory gyroscope device. A dual sense mass tuning fork gyroscope device may be used to reduce sensitivity of the device by configuring the sense masses to have antiphase motion. However, a dual sense mass approach may not be immune to rotational acceleration.

Accordingly, some angular rate sensors may utilize four (e.g., quad) sense masses to further reduce susceptibility of the gyroscope device to various vibrations causing rotational accelerations, such as board bending. In accordance with some embodiments, in order to ensure antiphase drive and sense motions of second sense mass 36 relative to first sense mass 34 and to ensure antiphase drive and sense motions of fourth sense mass 40 relative to third sense mass 38, first and second pivot structures 112, 114 are additionally implemented.

Figure 11:
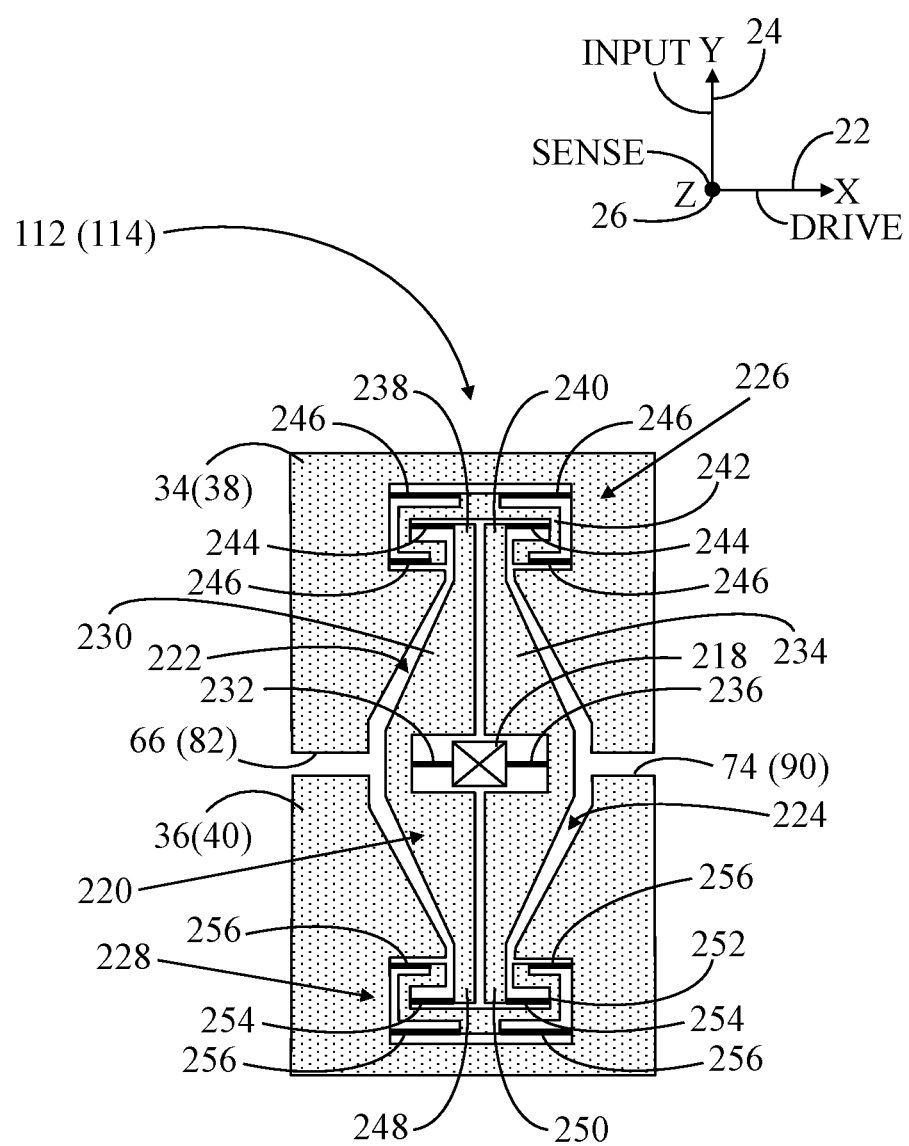
FIG. 11 shows a top view of a pivot structure that may be incorporated within the MEMS device of FIG. 1.

Referring to FIGS. 1 and 11, FIG. 11 shows a top view of a pivot structure that may be incorporated within angular rate sensor 20. In particular, FIG. 11 shows first pivot structure 112 located between and interconnecting first sense mass 34 and second sense mass 36. The following discussion applies equivalently to second pivot structure 114 located between and interconnecting third sense mass 38 and fourth sense mass 40. Thus, FIG. 11 includes reference numerals 112 (114) denoting this equivalency. Similarly, FIG. 11 includes reference numerals 34 (38) and 36 (40) denoting the attachments of first and second pivot structures 112, 114 to the respective first, second, third, and fourth sense masses 34, 36, 38, 40, described below.

First pivot structure 112 includes a pivot anchor 218 coupled to planar surface 32 of substrate 30 and a pivot linkage 220. Pivot anchor 218 is located between inner sidewall 66 of first sense mass 34 and inner sidewall 74 of second sense mass 36. In an example configuration, first sense mass 34 may include a recess 222 in inner sidewall 66 and second sense mass 36 may include a recess 224 in inner sidewall 74. Pivot anchor 218 is located between recesses 222, 224. As referred to herein, a recess (e.g., recesses 222, 224) is a cavity, void, indentation, or volume of space located on a sidewall of a sense mass outer perimeter that is parallel to X-Y plane 28.

Pivot linkage 220 generally has a first end 226 coupled to first sidewall 66 of first sense mass and a second end 228 coupled to second sidewall 74 of second sense mass 36. In an example configuration, pivot linkage 220 includes a first pivot bar 230 having a midpoint coupled to pivot anchor 218 by a spring 232 and a second pivot bar 234 having a midpoint coupled to pivot anchor 218 by a spring 236. Ends 238, 240 of first and second pivot bars 230, 234, respectively, are coupled to a rigid isolation structure 242 via springs 244 and isolation structure 242 is coupled to inner sidewall 66 within recess 222 of first sense mass 34 via springs 246. Opposing ends 248, 250 of first and second pivot bars 230, 234, respectively are coupled to a rigid isolation structure 252 via springs 254 and isolation structure 252 is coupled to inner sidewall 74 of second sense mass 36 via springs 256. Thus, first end 226 of pivot linkage 220 is coupled to inner sidewall 66 of first sense mass 34 via isolation structure 242 and springs 244, 246 and second end 228 of pivot linkage 220 is coupled to inner sidewall 74 of second sense mass 36 via isolation structure 252 and springs 254, 256.

Likewise, second pivot structure 114 includes pivot anchor 218 and pivot linkage 220, with pivot anchor 218 being located between inner sidewall 82 of third sense mass 38 and inner sidewall 90 of fourth sense mass 36. Again, in this configuration, third sense mass 38 may include recess 222 in inner sidewall 82 and fourth sense mass 40 may include recess 224 in inner sidewall 90 with pivot anchor 218 being located between recesses 222, 224. Pivot linkage 220 of second pivot structure generally has first end 226 coupled to first sidewall 82 of third sense mass 38 and a second end 228 coupled to second sidewall 90 of fourth sense mass 40 as previously described in detail above in connection with first and second sense masses 34, 36. Thus, first end 226 of pivot linkage 220 is coupled to inner sidewall 82 of third sense mass 38 via isolation structure 242 and springs 244, 246 and second end 228 of pivot linkage 220 is coupled to inner sidewall 90 of fourth sense mass 40 via isolation structure 252 and springs 254, 256.

First and second pivot structures 112, 114 are thus configured as a multiple-bar link (e.g., pivot anchor 218, first and second pivot bars 230, 234, and isolation structures 242, 252). First pivot structure 112 is configured to enable first and second sense masses 34, 36 to oscillate in antiphase in the X-axis direction parallel to drive axis 22 and to oscillate in antiphase in the Z-axis direction parallel to sense axis 26. Likewise, second pivot structure 114 is configured to enable third and fourth sense masses 38, 40 to oscillate in antiphase in the X-axis direction parallel to drive axis 22 and to oscillate in antiphase in the Z-axis direction parallel to sense axis 26. In general, springs 232, 236, 244, 254 are flexure beams that are capable of bending in-plane and twisting. Spring 246, 256 are compliant members that enable Y-axis motion (e.g., motion along input axis 24) at respective first and second ends 226, 228 of pivot linkage 220.

Figure 12:
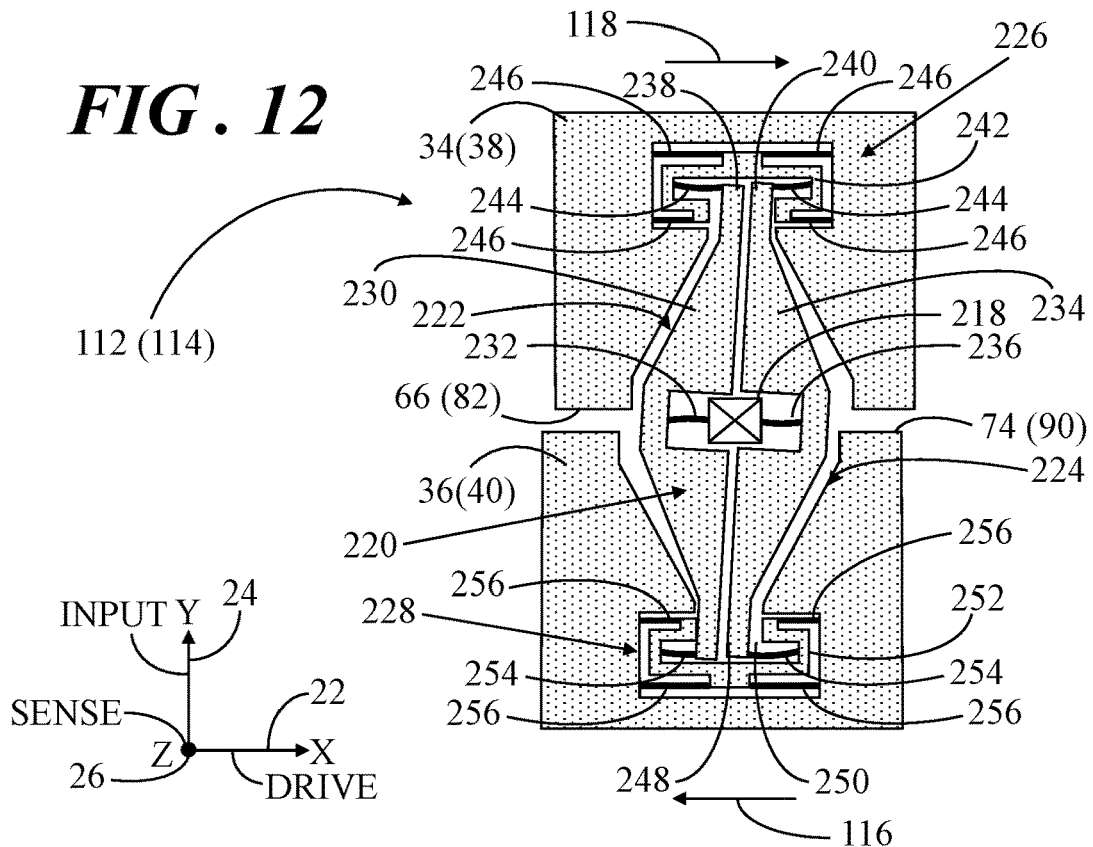
FIG. 12 shows a top view of the pivot structure pivoting in response to force exerted on a pair of the sense masses of the MEMS device of FIG. 1.

FIG. 12 shows a top view of first pivot structure 112 pivoting in response to force exerted on first and second sense masses 34, 36 of angular rate sensor 20 (FIG. 10. In this example, first sense mass 34 undergoes first drive motion 116 and second sense mass 36 undergoes second drive motion 118 in the opposite direction. In response, springs 232, 236, 244, 246, 254, 256 suitably deform such that the rigid first and second pivot bars 230, 234 pivot to allow translation of first and second sense masses 34, 36. Additionally, beams 244, 252 are configured to twist about the X-axis, e.g., drive axis 22, to enable antiphase Z-axis sense mass motion along sense axis 26.

Figure 13:
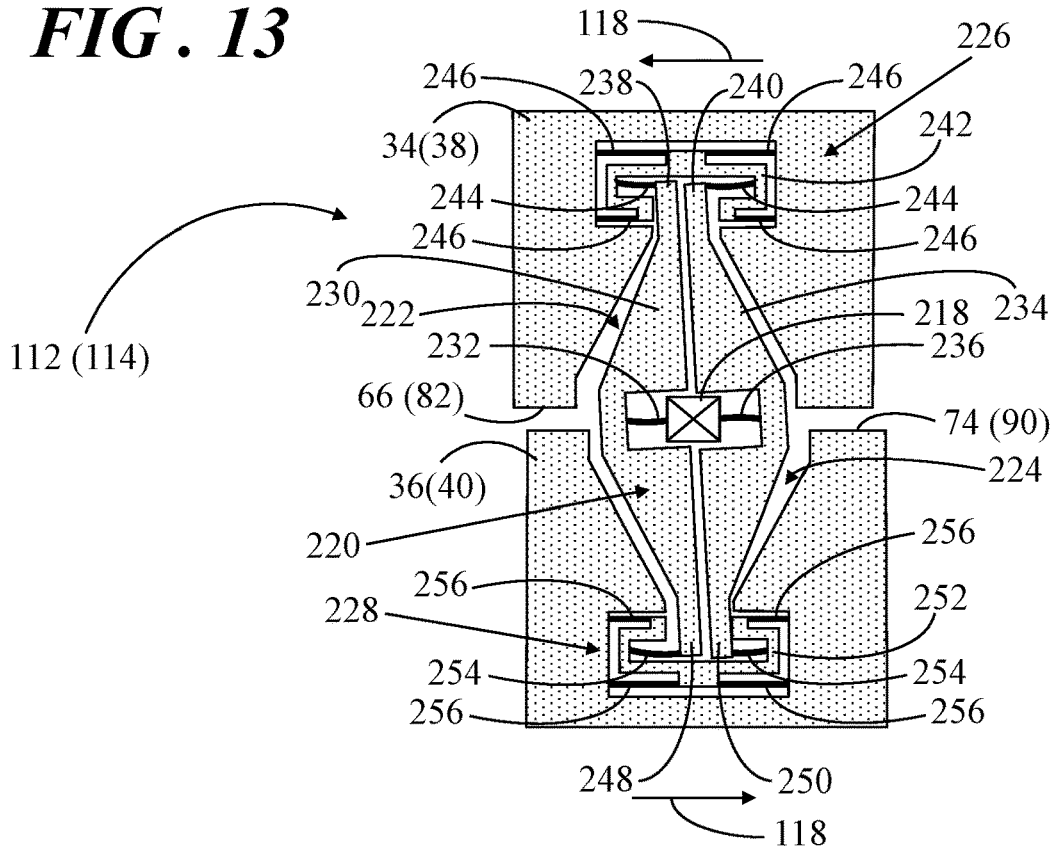
FIG. 13 shows a top view of the pivot structure pivoting in response to force exerted on a pair of the sense masses of the MEMS device of FIG. 1.

FIG. 13 shows a top view of first pivot structure 112 pivoting in response to force exerted on first and second sense masses 34, 36 of angular rate sensor 20 (FIG. 10. In this example, first sense mass 34 undergoes second drive motion 118 and second sense mass 36 undergoes first drive motion 116 in the opposite direction. Again, springs 232, 236, 244, 246, 254, 256 suitably deform such that the rigid first and second pivot bars 230, 234 pivot to allow translation of first and second sense masses 34, 36. Additionally, beams 244, 252 are configured to twist about the X-axis, e.g., drive axis 22, to enable antiphase Z-axis sense mass motion along sense axis 26. Thus, first and second pivot structures 112, 114 ensure that first, second, third, and fourth sense masses 34, 36, 38, 40 will suitably translate along drive axis 22 and translate along sense axis 26.

Figure 14:
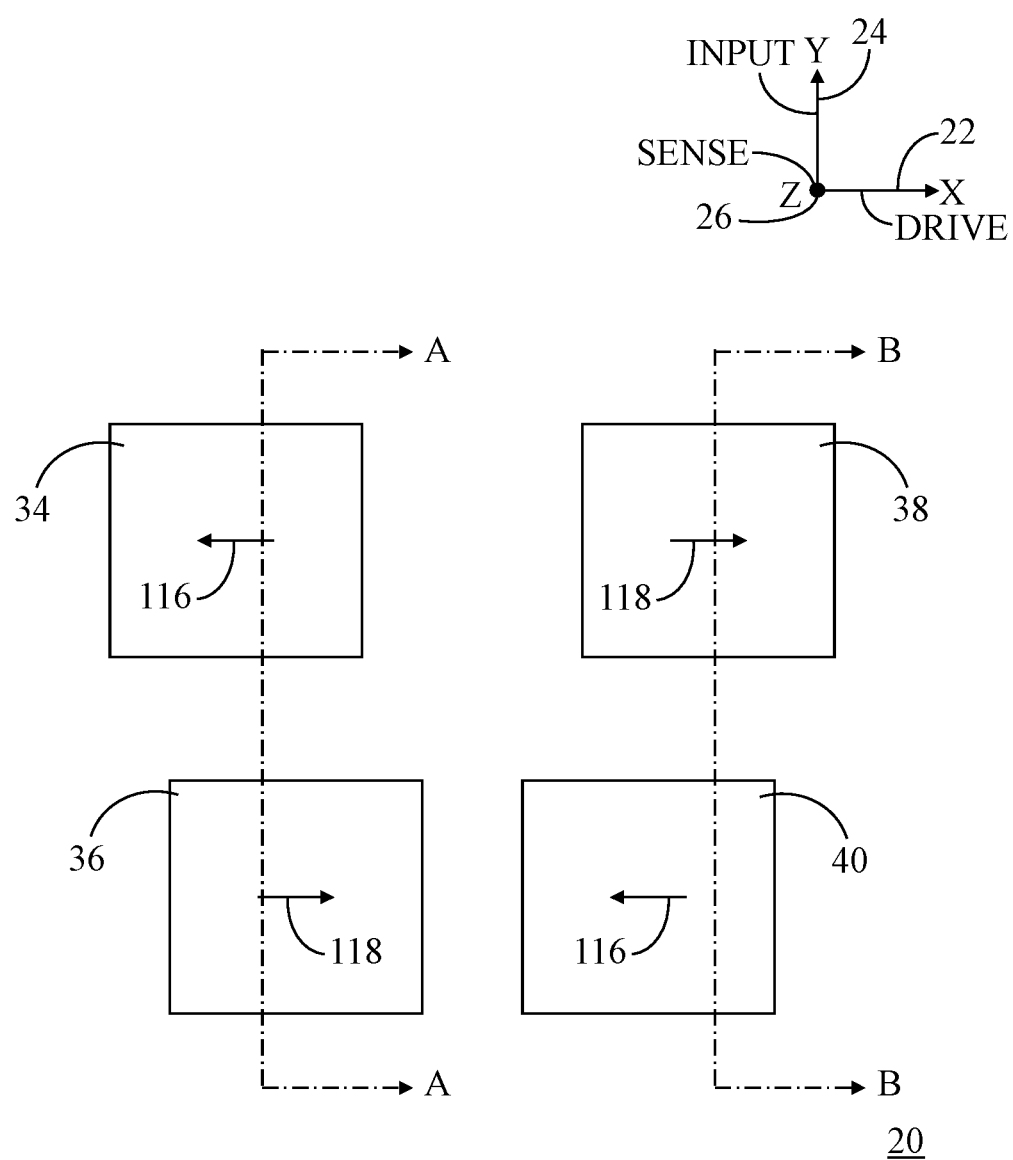
FIG. 14 shows a top view of the sense masses in the MEMS device of FIG. 1 undergoing antiphase drive motion.

FIG. 14 shows a top view of first, second, third, and fourth sense masses 34, 36, 38, 40 in angular rate sensor 20 (FIG. 1) undergoing antiphase drive motion in the opposing first and second drive directions 116, 118. In FIG. 14, first and fourth sense masses 34, 40 are moving in first drive direction 116 parallel to drive axis 22 and second and third sense masses 36, 38 are moving in second drive direction 118 parallel to drive axis that is also opposite from first drive direction 116. Of course, first, second, third, and fourth sense masses 34, 36, 38, 40 undergo oscillatory drive motion. Thus, at a subsequent instant in time, first and fourth sense masses 34, 40 will move in second drive direction 118 as second and third sense masses 36, 38 move in first drive direction 116.

FIG. 15 shows a cross-sectional side view of first and second sense masses 34, 36 along section lines A-A of FIG. 14. Drive axis 22 is now shown going into the page, input axis 24 is oriented right-left on the page, and sense axis 26 is oriented up-down on the page. FIG. 15 shows first and second sense masses 34, 36 in a neutral position in which angular rate sensor 20 is not undergoing rotation about input axis 24. When first and second sense masses 34, 36 do not experience rotation while being driven along drive axis 22, first and second sense masses 34, 36 oscillate in opposing drive directions 116, 118 as shown in FIG. 13 while maintaining a distance 258 above and parallel to their respective sense electrodes 260, 262. Similarly, when third and fourth sense masses 38, 40 do not experience rotation while being driven along drive axis 22, third and fourth sense masses 38, 40 will also oscillate in opposing drive directions 118, 116 as shown in FIG. 13 while maintaining distance 258 above and parallel to their respective sense electrodes 264, 266 (see FIG. 17).

Referring to FIGS. 16 and 17, FIG. 16 shows a cross-sectional side view of the sense masses along section lines A-A of FIG. 14 undergoing antiphase sense motion and FIG. 17 shows a cross-sectional side view of the sense masses along section lines B-B of FIG. 14. More particularly, FIG. 16 shows first and second sense masses 34, 36 as viewed rightward in FIG. 14 and FIG. 17 shows third and fourth sense masses 38, 40 as viewed rightward in FIG. 14. When first and second sense masses 34, 36 experience rotation (e.g., angular velocity 120) while being driven along drive axis 22, first and second sense masses 34, 36 oscillate in opposing sense directions 122, 124 parallel to sense axis 26 that is perpendicular to planar surface 32 of substrate 20 as shown in FIG. 16. Additionally, third and fourth sense masses 38, 40 oscillate in opposing directions 124, 122 parallel to sense axis 26 as shown in FIG. 17. Thus, in the aligned drawings, first and fourth sense masses 34, 40 undergo sense motion in first sense direction 122 while second and third sense masses 36, 40 undergo sense motion in the opposite second sense direction 124 in response to angular velocity 120 about input axis 24. First, second, third, and fourth sense masses 34, 36, 38, 40 can undergo oscillatory sense motion. Thus, at a subsequent instant in time, first and fourth sense masses 34, 40 can move in second sense direction 124 as second and third sense masses 36, 38 move in first sense direction 122.

In FIGS. 16 and 17, first and fourth sense masses 34, 40 are moving away from their respective sense electrodes 260, 266 which lengthens a distance 268 (relative to distance 258) between first and fourth sense masses 34, 40 and their respective sense electrodes 260, 266. Additionally, second and third sense masses 34, 40 are moving toward their respective sense electrodes 262, 264 which shortens a distance 270 (relative to distance 258) between second and third sense masses 36, 38 and their respective sense electrodes 262, 264. It should be observed that during the antiphase sense motion, first, second, third, and fourth sense masses 34, 36, 38, 40 remain substantially parallel to surface 32 of substrate 30 and therefore parallel to their respective sense electrodes 260, 262, 264, 266 thereby improving the efficiency of sense detection (e.g., detecting changing capacitance) by sense electrodes 260, 262, 264, 266.

Thus with reference to FIGS. 14-17, a method for operating MEMS angular rate sensor device 20 includes driving first and fourth sense masses 34, 40 via their respective actuators (e.g., first and fourth actuators 42, 48 in FIG. 1) in a first drive direction (e.g., first drive direction 116) parallel to a first axis (e.g., drive axis 22) oriented parallel to a planar surface (e.g., planar surface 32) of a substrate (e.g., substrate 30) and driving second and third sense masses 36, 38 via their respective actuators (e.g., second and third actuators 44, 46) in a second drive direction (e.g., second drive direction 118) that is opposite the first drive direction such that the second and third drive masses 36, 38 undergo antiphase drive motion relative to first and fourth sense masses 34, 40. MEMS angular rate sensor device 20 is sensitive to angular velocity 120 about a second axis (e.g., input axis 24) that is parallel to planar surface 32 of substrate 30 and perpendicular to the first axis (e.g., drive axis 22). Deflection of first, second, third, and fourth sense masses 34, 36, 38, 40 parallel to a third axis (e.g., sense axis 26) in response to angular velocity can be detected as a change in capacitance between first, second, third, and fourth sense masses 34, 36, 38, 40 and their corresponding sense electrodes 260, 262, 264, 266. First, second, third, and fourth output signals 272, 274, 276, 278 are generated in response to the deflection of first, second, third, and fourth sense masses 34, 36, 38, 40 parallel to a third axis (e.g., sense axis 26) and a magnitude of angular velocity 120 can be determined in response to first, second, third, and fourth output signals 272, 274, 276, 278. That is, movement of first, second, third, and fourth sense masses 34, 36, 38, 40 parallel to the third axis (e.g., sense axis 26) can be detected in response to first, second, third, and fourth output signals 272, 274, 276, 278.

Actual capacitors are not present between first, second, third, and fourth sense masses 34, 36, 38, 40 and their respective sense electrodes 260, 262, 264, 266. Rather, the capacitor symbols (shown in FIGS. 16 and 17 in dashed line form) represent first, second, third, and fourth output signals 272, 274, 276, 278 which in this example is a capacitance change between first, second, third, and fourth sense masses 34, 36, 38, 40 and their respective sense electrodes 260, 262, 264, 266 indicative of the movement of first, second, third, and fourth sense masses 34, 36, 38, 40 in response to angular velocity 120. First, second, third, and fourth output signals 272, 274, 276, 278 can be suitably processed to yield a magnitude of angular velocity 120.

Embodiments described herein entail MEMS devices and methods of operation. And embodiment of a MEMS device comprises a substrate having a planar surface, a first sense mass, a second sense mass, a third sense mass and a fourth sense mass spaced apart from the planar surface of the substrate, and a first actuator, a second actuator, a third actuator, and a fourth actuator. A first drive coupler interconnects the first sense mass and the first actuator, a second drive coupler interconnects the second sense mass and the second actuator, a third drive coupler interconnects the third sense mass and the third actuator, and a fourth drive coupler interconnects the fourth sense mass and the fourth actuator. Each of the first, second, third, and fourth drive couplers comprises a torsion bar having a length aligned parallel to an outer sidewall of an adjacent one of the first, second, third, and fourth sense masses, a first coupling link coupled to a first end of the torsion bar, and a second coupling link coupled to a second end of the torsion bar, the first and second coupling links coupling an adjacent one of the first, second, third, and fourth sense masses with a corresponding one of the first, second, third, and fourth actuators.

Another embodiment of a MEMS device comprises a substrate having a planar surface, a first sense mass, a second sense mass, a third sense mass, and a fourth sense mass spaced apart from the planar surface of the substrate, a first actuator, a second actuator, a third actuator, and a fourth actuator. A first drive coupler interconnects the first sense mass and the first actuator, a second drive coupler interconnecting the second sense mass and the second actuator, a third drive coupler interconnecting the third sense mass and the third actuator, and a fourth drive coupler interconnecting the fourth sense mass and the fourth actuator. Each of the first, second, third, and fourth drive couplers comprises a torsion bar having a length aligned parallel to an outer sidewall of an adjacent one of the first, second, third, and fourth sense masses, the length of the torsion bar being at least equivalent to an edge length of the outer sidewall of the corresponding one of the first, second, third, and fourth sense masses, a first coupling link coupled to a first end of the torsion bar, and a second coupling link coupled to a second end of the torsion bar, the first and second coupling links coupling an adjacent one of the first, second, third, and fourth sense masses with a corresponding one of the first, second, third, and fourth actuators. The first and fourth sense masses are configured to be driven via the first and fourth actuators in a first drive direction parallel to a first axis oriented parallel to the planar surface. The second and third sense masses are configured to be driven via the second and third actuators parallel to the first axis in a second drive direction that is opposite from the first drive direction such that the second and third sense masses undergo antiphase drive motion relative to the first and fourth sense masses. The MEMS device is sensitive to angular velocity about a second axis parallel to the planar surface of the substrate and perpendicular to the first axis. The first and fourth sense masses are configured to move in a first sense direction parallel to a third axis oriented perpendicular to the planar surface of the substrate in response to the angular velocity of the angular rate sensor about the second axis, and the second and third sense masses are configured to move in a second sense direction parallel to the third axis that is opposite from the first sense direction in response to the angular velocity of the angular rate sensor about the second axis such that the second and third sense masses undergo antiphase sense motion relative to the first and fourth sense masses.

An embodiment of a method for operating a MEMS angular rate sensor device that includes a substrate having a planar surface, a first sense mass, a second sense mass, a third sense mass a fourth sense mass, a first actuator, a second actuator, a third actuator, and a fourth actuator, the method comprising driving the first and fourth sense masses via the first and fourth actuators in a first drive direction parallel to a first axis oriented parallel to the planar surface, and driving the second and third sense masses via the second and third actuators parallel to the first axis in a second drive direction that is opposite from the first drive direction such that the second and third sense masses undergo antiphase drive motion relative to the first and fourth sense masses. A first drive coupler interconnects the first sense mass and the first actuator, a second drive coupler interconnects the second sense mass and the second actuator, a third drive coupler interconnects the third sense mass and the third actuator, and a fourth drive coupler interconnects the fourth sense mass and the fourth actuator. Each of the first, second, third, and fourth drive couplers comprises a torsion bar having a length aligned parallel to an outer sidewall of an adjacent one of the first, second, third, and fourth sense masses, a first coupling link coupled to a first end of the torsion bar, and a second coupling link coupled to a second end of the torsion bar, the first and second coupling links coupling an adjacent one of the first, second, third, and fourth sense masses with a corresponding one of the first, second, third, and fourth actuators.

Thus, a MEMS angular rate sensor device includes a four-sense mass architecture configured to sense angular velocity about an in-plane axis relative to the substrate. Further, the four sense masses are configured to be driven in-plane relative to the substrate with the sense motion of the sense masses being in a perpendicular out-of-plane direction. Still further, drive couplers are provided for tightly coupling each drive actuator with its corresponding sense mass for in-plane drive motion while isolating the in-plane drive motion from the out-of-plane sense motion. The drive couplers, drive mode and sense mode linkages, and pivot structures can improve the sense efficiency of the MEMS angular rate sensor device, where the drive couplers, drive mode and sense mode linkages, and pivot structures maintain a substantially parallel orientation of the sense masses to underlying electrodes. Additionally, the drive couplers, drive mode and sense mode linkages, and pivot structures mechanically constrain or suppress in-phase (i.e., common mode) drive and sense motion of the sense masses for improved accuracy and robustness.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A device comprising:
a substrate having a planar surface;
a first sense mass, a second sense mass, a third sense mass and a fourth sense mass spaced apart from the planar surface of the substrate;
a first actuator, a second actuator, a third actuator, and a fourth actuator;
a first drive coupler interconnecting the first sense mass and the first actuator;
a second drive coupler interconnecting the second sense mass and the second actuator;
a third drive coupler interconnecting the third sense mass and the third actuator; and
a fourth drive coupler interconnecting the fourth sense mass and the fourth actuator,
wherein each of the first, second, third, and fourth drive couplers comprises:
a torsion bar having a length aligned parallel to an outer sidewall of an adjacent one of the first, second, third, and fourth sense masses;
a first coupling link coupled to a first end of the torsion bar; and
a second coupling link coupled to a second end of the torsion bar, the first and second coupling links coupling an adjacent one of the first, second, third, and fourth sense masses with a corresponding one of the first, second, third, and fourth actuators.

2. The device of claim 1 wherein:
the first and fourth sense masses are configured to be driven via the first and fourth actuators in a first drive direction parallel to a first axis oriented parallel to the planar surface;
the second and third sense masses are configured to be driven via the second and third actuators parallel to the first axis in a second drive direction that is opposite from the first drive direction;
the device is sensitive to angular velocity about a second axis oriented parallel to the planar surface of the substrate and perpendicular to the first axis;
the first and fourth sense masses are configured to move in a first sense direction parallel to a third axis oriented perpendicular to the planar surface of the substrate in response to the angular velocity of the device about the second axis; and
the second and third sense masses are configured to move in a second sense direction parallel to the third axis that is opposite from the first sense direction in response to the angular velocity of the device about the second axis.

3. The device of claim 1 wherein the length of the torsion bar is at least equivalent to an edge length of the outer sidewall of the corresponding one of the first, second, third, and fourth sense masses.

4. The device of claim 1 wherein the first, second, third, and fourth sense masses are configured to be driven parallel to a first axis oriented parallel to the planar surface, the device is sensitive to angular velocity about a second axis oriented parallel to the planar surface of the substrate and perpendicular to the first axis, and the torsion bar is oriented parallel to the second axis.

5. The device of claim 1 further comprising first, second, third, and fourth suspension structures configured to suspend the first, second, third, and fourth actuators in spaced apart relationship from the planar surface of the substrate, each of the first, second, third, and fourth suspension structures comprising:
- a first anchor coupled to the planar surface of the substrate;
- a second anchor coupled to the planar surface of the substrate, the first and second anchors being positioned proximate opposing first and second longitudinal edges of a corresponding one of the first, second, third, and fourth actuators;
- a first spring structure interconnected between the first anchor and the first longitudinal edge of the corresponding one of the first, second, third, and fourth actuators; and
- a second spring structure interconnected between the second anchor and the second longitudinal edge of the corresponding one of the first, second, third, and fourth actuators.

6. The device of claim 1 further comprising:
- a first drive mode linkage;
- a second drive mode linkage, the first and second drive mode linkages being located between the first and third sense masses, and interconnecting the first sense mass to the third sense mass;
- a third drive mode linkage; and
- a fourth drive mode linkage, the third and fourth drive mode linkages being located between the second and fourth sense masses, and interconnecting the second sense mass to the fourth sense mass.

7. The device of claim 6 wherein:
the first sense mass has a first sidewall facing a third sidewall of the third sense mass;
the second sense mass has a second sidewall facing a fourth sidewall of the fourth sense mass;
the first drive mode linkage comprises a first anchor coupled to the planar surface of the substrate, a first bar structure having a middle region coupled to the first anchor by a first spring beam, a second spring beam coupled between an end of the first bar structure and the first sidewall of the first sense mass, and a third spring beam coupled between an opposite end of the first bar structure and the third sidewall of the third sense mass;
the second drive mode linkage comprises a second anchor coupled to the planar surface of the substrate, a second bar structure having a middle region coupled to the second anchor by a fourth spring beam, a fifth spring beam coupled between an end of the second bar structure and the first sidewall of the first sense mass, and a sixth spring beam coupled between an opposite end of the second bar structure and the third sidewall of the third sense mass;
the third drive mode linkage comprises a third anchor coupled to the planar surface of the substrate, a third bar structure having a middle region coupled to the third anchor by a seventh spring beam, an eighth spring beam coupled between an end of the third bar structure and the second sidewall of the second sense mass, and a ninth spring beam coupled between an opposite end of the third bar structure and the fourth sidewall of the fourth sense mass; and
the fourth drive mode linkage comprises a fourth anchor coupled to the planar surface of the substrate, a fourth bar structure having a middle region coupled to the fourth anchor by a tenth spring beam, an eleventh spring beam coupled between an end of the fourth bar structure and the second sidewall of the second sense mass, and a twelfth spring beam coupled between an opposite end of the fourth bar structure and the fourth sidewall of the fourth sense mass, wherein each of the first, second, third, and fourth bar structures has a length that is aligned with a corresponding one of the first, second, third, and fourth sidewalls.

8. The device of claim 6 further comprising:
- a first sense mode linkage located between the first and third sense masses, and interconnecting the first sense mass to the third sense mass; and
- a second sense mode linkage located between the second and fourth sense masses, and interconnecting the second sense mass to the fourth sense mass.

9. The device of claim 8 wherein:
the first sense mode linkage is positioned between the first and second drive mode linkages; and
the second sense mode linkage being positioned between the third and fourth drive mode linkages.

10. The device of claim 8 wherein:
the first, second, third, and fourth sense masses are configured to be driven parallel to a first axis oriented parallel to the planar surface;
the first sense mode linkage comprises a first anchor coupled to the planar surface of the substrate, a first beam structure having a length that is aligned with the first axis and having a middle region coupled to the first anchor by a first flexure, a second flexure coupled between an end of the first beam structure and the first sidewall of the first sense mass, and a third flexure coupled between an opposite end of the first beam structure and the third sidewall of the third sense mass; and
the second sense mode linkage comprises a second anchor coupled to the planar surface of the substrate, a second beam structure having a length that is aligned with the first axis and having a middle region coupled to the second anchor by a fourth flexure, a fifth flexure coupled between an end of the second beam structure and the second sidewall of the second sense mass, and a sixth flexure coupled between an opposite end of the second beam structure and the fourth sidewall of the fourth sense mass.

11. The device of claim 10 wherein:
the device is sensitive to angular velocity about a second axis parallel to the planar surface of the substrate and perpendicular to the first axis;
the first and fourth sense masses are configured to move in a first sense direction parallel to a third axis oriented perpendicular to the planar surface of the substrate in response to the angular velocity about the second axis;
the second and third sense masses are configured to move in a second sense direction parallel to the third axis that is opposite from the first sense direction in response to the angular velocity about the second axis such that first and third sense masses undergo antiphase sense motion relative to one another and second and fourth sense masses undergo antiphase sense motion relative to one another; and
the first and second sense mode linkages are configured to rotate about a rotational axis aligned with the second axis in response to the antiphase sense motion.

12. The device of claim 1 wherein:
the first sense mass has a first sidewall closest to the second sense mass;
the second sense mass has a second sidewall closest to the first sense mass;
the third sense mass has a third sidewall closest to the fourth sense mass;

the fourth sense mass has a fourth sidewall closest to the third sense mass; and the angular rate sensor further comprises:
  a first pivot structure that includes a first pivot linkage and a first pivot anchor, the first pivot linkage having a first end coupled to the first sidewall of the first sense mass and having a second end coupled to the second sidewall of the second sense mass, wherein the first pivot anchor is located between the first and second sidewalls, is coupled to the planar surface of the substrate, and is coupled to a midpoint of the first pivot linkage;
  a second pivot structure that includes a second pivot linkage and a second pivot anchor, the second pivot linkage having a third end coupled to the third sidewall of the third sense mass and having a fourth end coupled to the fourth sidewall of the fourth sense mass, wherein the second pivot anchor is located between the third and fourth sidewalls, is coupled to the planar surface of the substrate, and is coupled to a midpoint of the second pivot linkage.

13. The device of claim 12 wherein:
the first and fourth sense masses are configured to be driven via the first and fourth actuators in a first drive direction parallel to a first axis oriented parallel to the planar surface;
the second and third sense masses are configured to be driven via the second and third actuators parallel to the first axis in a second drive direction that is opposite from the first drive direction such that the first and second sense masses undergo antiphase drive motion relative to one another and the third and fourth sense masses undergo antiphase drive motion relative to one another;
the device is sensitive to angular velocity about a second axis oriented parallel to the planar surface of the substrate and perpendicular to the first axis;
the first and fourth sense masses are configured to move in a first sense direction parallel to a third axis oriented perpendicular to the planar surface of the substrate in response to angular velocity of the device about the second axis;
the second and third sense masses are configured to move in a second sense direction parallel to the third axis that is opposite from the first sense direction in response to the angular velocity of the device about the second axis such that the first and second sense masses undergo antiphase sense motion relative to one another and the third and fourth sense masses undergo antiphase sense motion relative to one another;
the first bar structure is configured to move flexibly about the first pivot anchor along the first axis and along the third axis, wherein opposite ends of the first bar structure are configured to move in opposite directions along the first axis and the opposite ends of the first bar structure are configured to more in opposite directions along the third axis; and
the second bar structure is configured to move flexibly about the second pivot anchor along the first axis and along the third axis, wherein opposite ends of the second bar structure are configured to move in opposite directions along the first axis and the opposite ends of the second bar structure are configured to more in opposite directions along the third axis.

14. A device comprising:
a substrate having a planar surface;
a first sense mass, a second sense mass, a third sense mass and a fourth sense mass spaced apart from the planar surface of the substrate;
a first actuator, a second actuator, a third actuator, and a fourth actuator;
a first drive coupler interconnecting the first sense mass and the first actuator;
a second drive coupler interconnecting the second sense mass and the second actuator;
a third drive coupler interconnecting the third sense mass and the third actuator; and
a fourth drive coupler interconnecting the fourth sense mass and the fourth actuator,
wherein each of the first, second, third, and fourth drive couplers comprises:
  a torsion bar having a length aligned parallel to an outer sidewall of an adjacent one of the first, second, third, and fourth sense masses, the length of the torsion bar being at least equivalent to an edge length of the outer sidewall of the corresponding one of the first, second, third, and fourth sense masses;
  a first coupling link coupled to a first end of the torsion bar; and
  a second coupling link coupled to a second end of the torsion bar, the first and second coupling links coupling an adjacent one of the first, second, third, and fourth sense masses with a corresponding one of the first, second, third, and fourth actuators, and wherein:
the first and fourth sense masses are configured to be driven via the first and fourth actuators in a first drive direction parallel to a first axis oriented parallel to the planar surface;
the second and third sense masses are configured to be driven via the second and third actuators parallel to the first axis in a second drive direction that is opposite from the first drive direction such that the second and third sense masses undergo antiphase drive motion relative to the first and fourth sense masses;
the device is sensitive to angular velocity about a second axis parallel to the planar surface of the substrate and perpendicular to the first axis;
the first and fourth sense masses are configured to move in a first sense direction parallel to a third axis oriented perpendicular to the planar surface of the substrate in response to the angular velocity of the angular rate sensor about the second axis; and
the second and third sense masses are configured to move in a second sense direction parallel to the third axis that is opposite from the first sense direction in response to the angular velocity of the angular rate sensor about the second axis such that the second and third sense masses undergo antiphase sense motion relative to the first and fourth sense masses.

15. The device of claim 14 wherein the torsion bar is oriented parallel to the second axis.

16. The device of claim 14 further comprising:
a first drive mode linkage;
a second drive mode linkage, the first and second drive mode linkages being located between the first and third sense masses, and interconnecting the first sense mass to the third sense mass;
a third drive mode linkage; and
a fourth drive mode linkage, the third and fourth drive mode linkages being located between the second and fourth sense masses, and interconnecting the second sense mass to the fourth sense mass.

17. The device of claim 16 further comprising:
a first sense mode linkage located between the first and third sense masses, and interconnecting the first sense mass to the third sense mass, the first sense mode linkage being positioned between the first and second drive mode linkages; and
a second sense mode linkage located between the second and fourth sense masses, and interconnecting the second sense mass to the fourth sense mass, the second sense mode linkage being positioned between the third and fourth drive mode linkages.

18. The device of claim 17 wherein:
the first sense mass has a first sidewall closest to the second sense mass;
the second sense mass has a second sidewall closest to the first sense mass;
the third sense mass has a third sidewall closest to the fourth sense mass;
the fourth sense mass has a fourth sidewall closest to the third sense mass; and
the angular rate sensor further comprises:
a first pivot structure that includes a first pivot linkage and a first pivot anchor, the first pivot linkage having a first end coupled to the first sidewall of the first sense mass and having a second end coupled to the second sidewall of the second sense mass, wherein the first pivot anchor is located between the first and second sidewalls, is coupled to the planar surface of the substrate, and is coupled to a midpoint of the first pivot linkage;
a second pivot structure that includes a second pivot linkage and a second pivot anchor, the second pivot linkage having a third end coupled to the third sidewall of the third sense mass and having a fourth end coupled to the fourth sidewall of the fourth sense mass, wherein the second pivot anchor is located between the third and fourth sidewalls, is coupled to the planar surface of the substrate, and is coupled to a midpoint of the second pivot linkage.

19. A method for operating an angular rate sensor device that includes a substrate having a planar surface, a first sense mass, a second sense mass, a third sense mass, a fourth sense mass, a first actuator, a second actuator, a third actuator, and a fourth actuator, the method comprising:

driving the first and fourth sense masses via the first and fourth actuators in a first drive direction parallel to a first axis oriented parallel to the planar surface; and
driving the second and third sense masses via the second and third actuators parallel to the first axis in a second drive direction that is opposite from the first drive direction such that the second and third sense masses undergo antiphase drive motion relative to the first and fourth sense masses;
wherein a first drive coupler interconnects the first sense mass and the first actuator, a second drive coupler interconnects the second sense mass and the second actuator, a third drive coupler interconnects the third sense mass and the third actuator, and a fourth drive coupler interconnects the fourth sense mass and the fourth actuator; and
wherein each of the first, second, third, and fourth drive couplers comprises a torsion bar having a length aligned parallel to an outer sidewall of an adjacent one of the first, second, third, and fourth sense masses, a first coupling link coupled to a first end of the torsion bar, and a second coupling link coupled to a second end of the torsion bar, the first and second coupling links coupling an adjacent one of the first, second, third, and fourth sense masses with a corresponding one of the first, second, third, and fourth actuators.

20. The method of claim 19 wherein the angular rate sensor device is sensitive to angular velocity about a second axis parallel to the planar surface of the substrate and perpendicular to the first axis, and the method further comprises:
detecting deflection of the first and fourth sense masses in a first sense direction parallel to a third axis that is perpendicular to the planar surface of the substrate in response to the angular velocity;
detecting deflection of the second and third sense masses in a second sense direction parallel to the third axis that is perpendicular to the planar surface of the substrate in response to the angular velocity; and
generating first, second, third, and fourth output signals in response to the deflection of the first, second, third, and fourth sense masses parallel to the third axis.

* * * * *